US010035879B2

(12) United States Patent
Iwamoto et al.

(10) Patent No.: US 10,035,879 B2
(45) Date of Patent: *Jul. 31, 2018

(54) OXYGEN-ABSORBING RESIN COMPOSITION AND OXYGEN-ABSORBING MULTILAYER INJECTION-MOLDED ARTICLE AND OXYGEN-ABSORBING MULTILAYER CONTAINER USING SAME

(71) Applicant: MITSUBISHI GAS CHEMICAL COMPANY, INC., Tokyo (JP)

(72) Inventors: Shinpei Iwamoto, Kanagawa (JP); Satoshi Okada, Kanagawa (JP); Shinichi Ikeda, Tokyo (JP); Fumihiro Ito, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/770,937

(22) PCT Filed: Mar. 5, 2014

(86) PCT No.: PCT/JP2014/055646
§ 371 (c)(1),
(2) Date: Aug. 27, 2015

(87) PCT Pub. No.: WO2014/136844
PCT Pub. Date: Sep. 12, 2014

(65) Prior Publication Data
US 2016/0017092 A1 Jan. 21, 2016

(30) Foreign Application Priority Data
Mar. 6, 2013 (JP) .................. 2013-044551

(51) Int. Cl.
C08K 5/098 (2006.01)
C08G 63/181 (2006.01)
C08G 63/91 (2006.01)
B32B 27/36 (2006.01)
B32B 27/08 (2006.01)
B32B 27/20 (2006.01)
B32B 1/02 (2006.01)
B65D 81/26 (2006.01)
B32B 27/32 (2006.01)
C08G 63/19 (2006.01)

(52) U.S. Cl.
CPC ............. *C08G 63/916* (2013.01); *B32B 1/02* (2013.01); *B32B 27/08* (2013.01); *B32B 27/20* (2013.01); *B32B 27/36* (2013.01); *B65D 81/266* (2013.01); *C08G 63/181* (2013.01); *C08K 5/098* (2013.01); *B32B 2264/105* (2013.01); *B32B 2307/54* (2013.01); *B32B 2307/7244* (2013.01); *B32B 2307/74* (2013.01); *B32B 2439/00* (2013.01); *B32B 2439/60* (2013.01); *B32B 2439/70* (2013.01)

(58) Field of Classification Search
CPC .... C08G 63/181; C08G 63/127; C08G 63/19; C08G 63/60; C08G 63/64; C08G 63/916; C08G 63/672; C08G 63/668; C08G 63/199; C08G 63/83; C08G 63/866; C08K 5/098; C08L 67/02; C08L 77/06; B32B 1/02; B32B 2264/105; B32B 2307/54; B32B 2307/7244; B32B 2307/74; B32B 2439/00; B32B 2439/60; B32B 2439/70; B32B 27/08; B32B 27/20; B32B 27/36; B32B 81/266
See application file for complete search history.

(56) References Cited

U.S. PATENT DOCUMENTS 3,505,282 A * 4/1970 Farrar .................. C08G 63/181
528/180
6,527,976 B1 * 3/2003 Cai ........................ C08K 5/098
252/188.28
6,653,440 B2 * 11/2003 Hirokane ............... C08G 63/16
528/272

(Continued)

FOREIGN PATENT DOCUMENTS

| CN | 1396208 | 2/2003 |
| EP | 0 507 207 A2 | 10/1992 |
| EP | 0 850 967 | 12/1997 |
| JP | 5-115776 A | 5/1993 |
| JP | 9-234832 A | 9/1997 |
| JP | H10-331032 A | 12/1998 |
| JP | 2000-212121 A | 8/2000 |
| JP | 2001-252560 A | 9/2001 |

(Continued)

OTHER PUBLICATIONS

International Search Report issued for Patent Application No. PCT/JP2014/055646, dated Apr. 8, 2014.

(Continued)

*Primary Examiner* — Ling-Siu Choi
*Assistant Examiner* — Gennadiy Mesh
(74) *Attorney, Agent, or Firm* — Greenblum & Bernstein, P.L.C.

(57) ABSTRACT

An oxygen-absorbing resin composition containing a polyester compound, and a transition metal catalyst, and wherein the polyester compound is a polyester compound having a tetralin ring obtained by synthesis using a zinc compound contained in a catalyst; the zinc compound contained in a catalyst is present together with the obtained polyester compound in the oxygen-absorbing resin composition; the transition metal catalyst is different from the zinc compound contained in a catalyst; and the oxygen-absorbing resin composition is obtained by mixing the transition metal catalyst with the polyester compound present together with the zinc compound contained in a catalyst.

8 Claims, No Drawings

(56) References Cited

U.S. PATENT DOCUMENTS

| | | | |
|---|---|---|---|
| 2003/0068455 A1* | 4/2003 | Oguro | ............... C08L 67/02 428/35.7 |
| 2008/0161472 A1 | 7/2008 | Jenkins et al. | |
| 2013/0284617 A1 | 10/2013 | Yamada et al. | |
| 2014/0225034 A1 | 8/2014 | Okada | |

FOREIGN PATENT DOCUMENTS

| | | |
|---|---|---|
| JP | 2003-521552 A | 7/2003 |
| JP | 2004-338163 A | 12/2004 |
| JP | 2011-225638 A | 11/2011 |
| JP | 2013-129817 A1 | 7/2013 |
| TW | 200835746 | 9/2008 |
| WO | 99/48963 A2 | 9/1999 |
| WO | 2011/060304 | 5/2011 |
| WO | 2012/102086 | 8/2012 |
| WO | 2013/031877 A1 | 3/2013 |

OTHER PUBLICATIONS

International Preliminary Report on patentability issued for Patent Application No. PCT/JP2014/055646, dated Sep. 8, 2015.

* cited by examiner

OXYGEN-ABSORBING RESIN COMPOSITION AND OXYGEN-ABSORBING MULTILAYER INJECTION-MOLDED ARTICLE AND OXYGEN-ABSORBING MULTILAYER CONTAINER USING SAME

TECHNICAL FIELD

The present invention relates to an oxygen-absorbing resin composition, particularly to an oxygen-absorbing resin composition at least containing a polyester compound having a tetralin ring obtained by synthesis using a zinc compound and a transition metal catalyst. The present invention also relates to an oxygen-absorbing multilayer injection-molded article and an oxygen-absorbing multilayer container using the above oxygen-absorbing resin composition.

BACKGROUND ART

In order to prevent oxygen oxidation and store various types of articles, represented by foods, beverages, medicinal products, cosmetics, etc., which easily deteriorate or degrade under the effect of oxygen for a long time, oxygen absorbents are used for removing oxygen within packaging bodies storing these articles.

As the oxygen absorbent, an oxygen absorbent containing an iron powder as a reactive main component is generally used in view of oxygen-absorbing ability, handling and safety. However, the iron-based oxygen absorbent is responsive to a metal detector and thus it is difficult to use a metal detector in inspecting foreign matter. Furthermore, packaging bodies containing an iron-based oxygen absorbent have a risk of ignition, and thus, they cannot be heated by a microwave oven. Moreover, the oxidation reaction of an iron powder requires water, and thus, an oxygen-absorbing effect is exerted only when the article to be packed is rich in moisture content.

Packaging containers are developed by making the container of a multilayer material having an oxygen-absorbing layer formed of an oxygen-absorbing resin composition containing a thermoplastic resin and an iron-based oxygen absorbent, thereby improving a gas barrier property of the container and providing an oxygen-absorbing function to the container itself (see, Patent Document 1). However, such a multilayer container has the same problems: a metal detector cannot be used; heating cannot be made by a microwave oven; and the effect is only exerted on an article to be packed rich in moisture content. In addition, the multilayer container has a problem of opacity, leading to insufficient visibility of content.

In the aforementioned circumstances, it has been desired to develop an oxygen absorbent containing an organic substance as a reactive main component in place of an iron-based oxygen absorbent. As the oxygen absorbent containing an organic substance as a reactive main component, for example, an oxygen absorbent containing ascorbic acid as a main component is known so far (see, Patent Document 2).

In the meantime, an oxygen-absorbing resin composition composed of a resin and a transition metal catalyst is known. For example, a resin composition composed of a polyamide as an oxidizable organic component (in particular, a xylylene group-containing polyamide) and a transition metal catalyst, is known (see, Patent Document 3). In Patent Documents 3, articles obtained by molding a resin composition, such as an oxygen absorbent, a packaging material and a multilayer laminated film for packaging are also exemplified.

As an oxygen-absorbing resin composition requiring no moisture content for absorbing oxygen, an oxygen-absorbing resin composition composed of a resin having a carbon-carbon unsaturated bond and a transition metal catalyst, is known (see, Patent Document 4).

As a composition for trapping oxygen, a composition composed of a polymer containing a substituted cyclohexene ring or a low molecular-weight substance bound with the cyclohexene ring and a transition metal is known (see, Patent Document 5).

CITATION LIST

Patent Documents

Patent Document 1: Japanese Patent Application Laid-Open No. 9-234832
Patent Document 2: Japanese Patent Application Laid-Open No. 51-136845
Patent Document 3: Japanese Patent Application Laid-Open No. 2001-252560
Patent Document 4: Japanese Patent Application Laid-Open No. 5-115776
Patent Document 5: National Publication of International Patent Application No. 2003-521552

SUMMARY OF INVENTION

Technical Problem

However, the oxygen absorbent composition described in Patent Document 2 has problems in that the oxygen-absorbing performance is primarily low; an effect is exerted only on an article to be packed rich in moisture content; and the cost is relatively high.

The resin composition described in Patent Document 3 exerts an oxygen-absorbing performance by oxidizing a xylylene group-containing polyamide resin in the presence of a transition metal catalyst being included in the composition. For this reason, such a resin composition has a problem in that the polymer chain of the resin is cut by oxidation degradation after absorption of oxygen, with the result that the strength of the packaging container itself decreases. Another problem of the resin composition described therein is that the oxygen-absorbing performance is still insufficient and the effect is exerted only on an article to be packed rich in moisture content.

The oxygen-absorbing resin composition described in Patent Document 4 has the same problem as mentioned above, that is, the polymer chain of the resin is cut by oxidation to produce low molecular-weight organic compounds serving as odor-producing components, with the result that odor is produced after absorption of oxygen.

In the composition described in Patent Document 5, a special material containing a cyclohexene ring must be used. This material still has a problem in relatively easily producing odor.

The present invention was made in consideration of the problems mentioned above. An object of the invention is to provide a novel oxygen-absorbing resin composition not responding to a metal detector, suppressing odor generation and decrease in strength after absorption of oxygen and having excellent oxygen-absorbing performance in a wide range of humidity conditions from low humidity to high humidity and even on an article to be packed not rich in moisture content, and provide an oxygen-absorbing multilayer injection-molded article and an oxygen-absorbing multilayer container using the composition.

Solution to Problem

The present inventors conducted intensive studies on an oxygen-absorbing resin composition. As a result, they found that the aforementioned problems are solved by using a polyester compound having a tetralin ring obtained by synthesis using a zinc compound and a transition metal catalyst, and accomplished the present invention.

More specifically, the present invention is as follows.

[1] An oxygen-absorbing resin composition containing a polyester compound and a transition metal catalyst, wherein the polyester compound has at least one constituent unit having a tetralin ring selected from the group consisting of constituent units represented by the following general formulas (1) to (4):

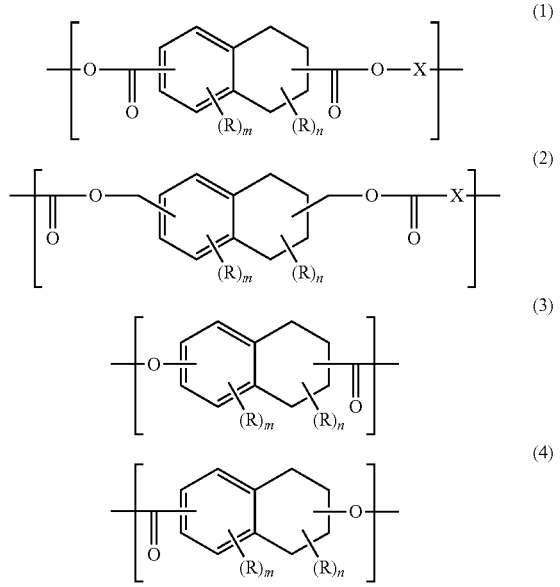

where R each independently represent a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, these of which may further have a substituent; where m each independently represent an integer of 0 to 3; where n each independently represent an integer of 0 to 6, and at least one hydrogen atom is bound to a benzyl position of the tetralin ring; where X each independently represent a divalent group containing at least one group selected from the group consisting of an aromatic hydrocarbon group, a saturated or unsaturated alicyclic hydrocarbon group, a linear or branched and saturated or unsaturated aliphatic hydrocarbon group and a heterocyclic group; and wherein the polyester compound is a polyester compound having a tetralin ring obtained by synthesis using a zinc compound.

[2] The oxygen-absorbing resin composition according to the above [1], wherein the transition metal catalyst contains at least one transition metal selected from the group consisting of manganese, iron, cobalt, nickel and copper.

[3] The oxygen-absorbing resin composition according to the above [1] or [2], wherein the transition metal catalyst is contained in an amount from 0.001 parts by mass or more to 10 parts by mass or less in terms of a transition metal based on 100 parts by mass of the polyester compound.

[4] The oxygen-absorbing resin composition according to any of the above [1] to [3], wherein the zinc compound is contained in the oxygen-absorbing resin composition in an amount from 0.001 parts by mass or more to 10 parts by mass or less in terms of a zinc metal based on 100 parts by mass of the polyester compound.

[5] The oxygen-absorbing resin composition according to any of the above [1] to [4], wherein the constituent unit represented by the general formula (1) is at least one selected from the group consisting of the constituent units represented by the following formulas (5) to (7):

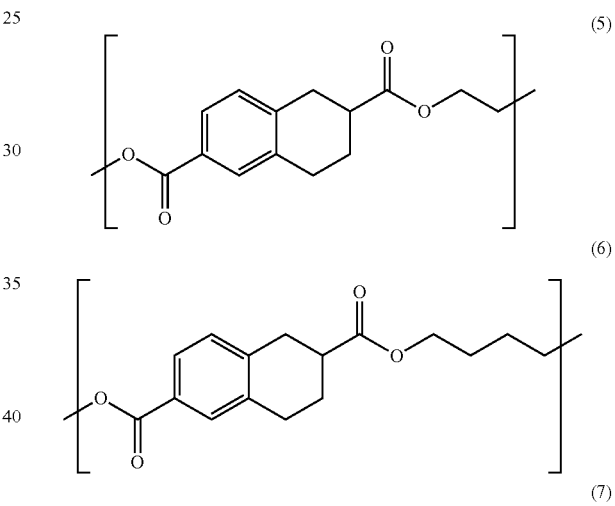

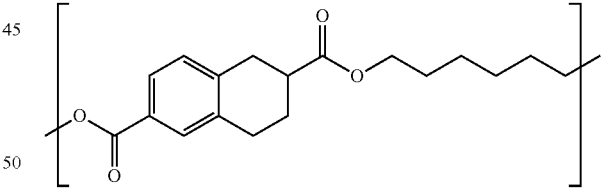

[6] An oxygen-absorbing multilayer injection-molded article having an oxygen-absorbing layer formed of the oxygen-absorbing resin composition according to any of the above [1] to [5] and a resin layer containing a thermoplastic resin.

[7] An oxygen-absorbing multilayer container obtained by molding the oxygen-absorbing multilayer injection-molded article according to the above [6] into a cup or bottle form.

[8] The oxygen-absorbing multilayer container according to the above [7], wherein the molding is stretch blow molding.

Advantageous Effects of Invention

According to the present invention, it is possible to provide an oxygen-absorbing resin composition having excellent oxygen-absorbing performance in a wide range of humidity conditions from low humidity to high humidity and an oxygen-absorbing multilayer injection-molded article as well as an oxygen-absorbing multilayer container using the composition. The oxygen-absorbing resin composition, etc. of the present invention can absorb oxygen regardless of the presence or absence of the moisture content of an article to be packed, produce no odor after absorption of oxygen and suppress the reduction in strength. Consequently, the oxygen-absorbing resin composition, etc. of the present invention can be applied to a wide variety of uses including foods, cooking foods, beverages, medicinal products and health foods, no matter which type of articles to be packed they are. Further, the oxygen-absorbing resin composition, etc. of the present invention have the advantage of being not responsive to a metal detector.

DESCRIPTION OF EMBODIMENTS

Now, embodiments of the present invention (hereinafter also referred to as "the present embodiment") will be described below. Note that the following embodiments are examples for explaining the present invention and the present invention is not limited to the embodiments alone.

[Oxygen-Absorbing Resin Composition]

The oxygen-absorbing resin composition of the present embodiment is an oxygen-absorbing resin composition containing a polyester compound and a transition metal catalyst, wherein the polyester compound has at least one constituent unit having a tetralin ring selected from the group consisting of constituent units represented by the following general formulas (1) to (4):

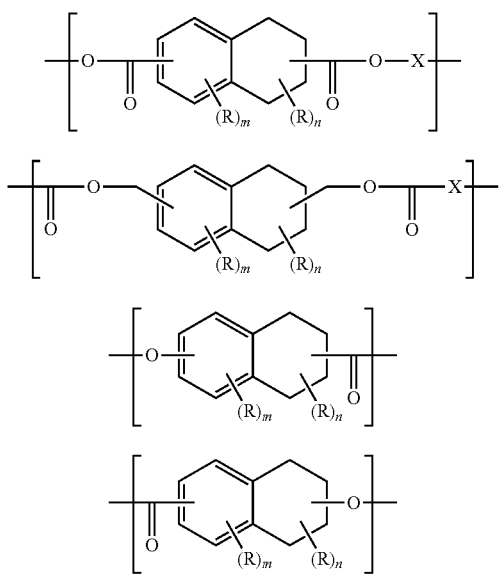

where R each independently represent a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, these of which may further have a substituent; where m each independently represent an integer of 0 to 3; where n each independently represent an integer of 0 to 6, and at least one hydrogen atom is bound to a benzyl position of the tetralin ring; where X each independently represent a divalent group containing at least one group selected from the group consisting of an aromatic hydrocarbon group, a saturated or unsaturated alicyclic hydrocarbon group, a linear or branched and saturated or unsaturated aliphatic hydrocarbon group and a heterocyclic group; and wherein the polyester compound is a polyester compound having a tetralin ring obtained by synthesis using a zinc compound.

[Tetralin Ring-Containing Polyester Compound]

The polyester compound having a tetralin ring contained in the oxygen-absorbing resin composition of the present embodiment (hereinafter also referred to as "tetralin ring containing polyester compound") contains at least one of the constituent units represented by the above general formulas (1) to (4). It is preferable that the constituent unit represented by the above general formula (1) is at least one selected from the group consisting of constituent units represented by the above formulas (5) to (7). The phrase of "contains . . . a constituent unit" herein means that one or more constituent units are contained in a compound. It is preferable that the above constituent unit is contained as a repeat unit in a tetralin ring-containing polyester compound. The tetralin ring-containing polyester compound may be any one of a homopolymer of the above constituent unit, a random copolymer of the above constituent unit and another constituent unit, and a block copolymer of the above constituent unit and another constituent unit.

In the constituent units represented by the above general formulas (1) to (4), examples of the monovalent substituent represented by R include, but not particularly limited to, a halogen atom (for example, a chlorine atom, a bromine atom, an iodine atom), an alkyl group (a linear, branched or cyclic alkyl group having preferably 1 to 15 carbon atoms and more preferably 1 to 6 carbon atoms, such as a methyl group, an ethyl group, a n-propyl group, an isopropyl group, a t-butyl group, a n-octyl group, a 2-ethylhexyl group, a cyclopropyl group, and a cyclopentyl group), an alkenyl group (a linear, branched or cyclic alkenyl group having preferably 2 to 10 carbon atoms and more preferably 2 to 6 carbon atoms, such as a vinyl group and an allyl group), an alkynyl group (an alkynyl group having preferably 2 to 10 carbon atoms and more preferably 2 to 6 carbon atoms, such as an ethynyl group and a propargyl group), an aryl group (an aryl group having preferably 6 to 16 carbon atoms and more preferably 6 to 10 carbon atoms, such as a phenyl group and a naphthyl group), a heterocyclic group (a monovalent group obtained by removing a single hydrogen atom from a 5-member or 6-member aromatic or non-aromatic heterocyclic compound having preferably 1 to 12 carbon atoms and more preferable 2 to 6 carbon atoms, such as a 1-pyrazolyl group, a 1-imidazolyl group and a 2-furyl group), a cyano group, a hydroxy group, a carboxyl group, an ester group, an amido group, a nitro group, an alkoxy group (linear, branched or cyclic alkoxy group having preferably 1 to 10 carbon atoms and more preferably 1 to 6 carbon atoms, such as a methoxy group and an ethoxy group), an aryloxy group (an aryloxy group having preferably 6 to 12 carbon atoms and more preferably 6 to 8 carbon atoms, such as a phenoxy group), an acyl group (including a formyl group. An alkyl carbonyl group having preferably 2 to 10 carbon atoms and more preferably 2 to 6 carbon atoms, and an arylcarbonyl group having preferably 7 to 12 carbon atoms and more preferably 7 to 9 carbon atoms, such as an acetyl group, a pivaloyl group and a benzoyl group), an amino group (an alkylamino group having preferably 1 to 10 carbon atoms and more preferably 1 to 6 carbon atoms, an anilino group having preferably 6 to 12 carbon atoms and more preferably 6 to 8 carbon atoms, a heterocyclic amino group having preferably 1 to 12 carbon atoms and more preferably 2 to 6 carbon atoms, such as an amino group, a methylamino group and an anilino group), a thiol group, an alkylthio group (an alkylthio group having preferably 1 to 10 carbon atoms and more preferably 1 to 6 carbon atoms, such as a methylthio group and an ethylthio group), an arylthio group (an arylthio group having preferably 6 to 12 carbon atoms and more preferably 6 to 8 carbon atoms, such as a phenylthio group), a heterocyclic thio group (a heterocyclic thio group having preferably 2 to 10 carbon atoms and more preferably 1 to 6 carbon atoms, such as a 2-benzothiazolylthio group), an imido group (an imido group having preferably 2 to 10 carbon atoms and more preferably 4 to 8 carbon atoms, such as a N-succinimido group and a N-phthalimido group).

Note that when the above monovalent substituent R has a hydrogen atom, the hydrogen atom may be further substituted with a substituent T (herein, substituent T is the same as defined in the above monovalent substituent R). Specific examples thereof include, but not particularly limited to, an alkyl group substituted with a hydroxy group (for example, a hydroxyethyl group), an alkyl group substituted with an alkoxy group (for example, a methoxyethyl group), an alkyl group substituted with an aryl group (for example, a benzyl group), an alkyl group substituted with a primary or secondary amino group (for example, an aminoethyl group), an aryl group substituted with an alkyl group (for example, a p-tolyl group) and an aryloxy group substituted with an alkyl group (for example, a 2-methylphenoxy group). Note that when the monovalent substituent R has a monovalent substituent T, the number of carbon atoms of the substituent T is not included in the number of carbon atoms mentioned above. For example, a benzyl group is regarded as an alkyl group having a single carbon atom substituted with a phenyl group and not regarded as an alkyl group having 7 carbon atoms substituted with a phenyl group. Furthermore, when the above monovalent substituent R has a substituent T, the substituent T may be at least one and may be plural.

In the constituent units represented by the above general formulas (1) to (4), X represents a divalent group containing at least one group selected from the group consisting of an aromatic hydrocarbon group, a saturated or unsaturated alicyclic hydrocarbon group, a linear or branched and saturated or unsaturated aliphatic hydrocarbon group and a heterocyclic group. The aromatic hydrocarbon group, saturated or unsaturated alicyclic hydrocarbon group, linear or branched and saturated or unsaturated aliphatic hydrocarbon group and heterocyclic group may be substituted or unsubstituted. X may contain a hetero atom or an ether group, a sulfide group, a carbonyl group, a hydroxy group, an amino group, a sulfoxide group or a sulfone group. Herein, examples of the aromatic hydrocarbon group include, but not particularly limited to, an o-phenylene group, a m-phenylene group, a p-phenylene group, a methylphenylene group, an o-xylylene group, a m-xylylene group, a p-xylylene group, a naphthylene group, an anthracenylene group, a phenanthrylene group, a biphenylene group and a fluonylene group. Examples of the alicyclic hydrocarbon group include, but not particularly limited to, cycloalkenylene groups such as a cyclopentylene group, a cyclohexylene group, a methylcyclohexylene group, a cycloheptylene group and a cyclooctylene group; and cycloalkenylene groups such as a cyclohexycenylene group. Examples of the aliphatic hydrocarbon group include, but not particularly limited to, linear or branched alkylene groups such as a methylene group, an ethylene group, a trimethylene group, a propylene group, an isopropylidene group, a tetramethylene group, an isobutylidene group, a sec-butylidene group, a pentamethylene group, a hexamethylene group, a heptamethylene group, an octamethylene group, a nonamethylene group and a dacamethylene group; and alkenylene groups such as a vinylene group, a propenylene group, a 1-butenylene group, a 2-butenylene group, a 1,3-butadienylene group, a 1-pentenylene group, a 2-pentenylene group, a 1-hexenylene group, a 2-hexenylene group and a 3-hexenylene group. Examples of the heterocyclic group include, but not particularly limited to, 5-member rings containing 1 hetero atom such as a furanyl group, a thiophenyl group, and a pyrrolyl group, 6-member rings containing 1 hetero atom such as a pyridinyl group, 5-member rings containing 2 hetero atoms such as an oxazolyl group and a thiazolyl group, 6-member rings containing 2 hetero atoms such as a pyridazinyl group and a pyrimidinyl group, other 5, 6 and 7-member rings containing at least one hetero atom, dicyclic condensed hetero groups containing 1 hetero atom such as an indolyl group and a quinolinyl group, dicyclic condensed hetero groups containing 2 hetero atoms such as a quinoxalinyl group, tricyclic condensed hetero groups containing 1 hetero atom such as an acridinyl group, dicyclic condensed hetero groups containing 2 hetero atoms such as an indazolyl group, and other polycyclic condensed hetero groups containing at least one hetero atom. These may further have a substituent. Specific examples thereof include, but not particularly limited to, a halogeno group, an alkoxy group, a hydroxy group, a carboxyl group, a carboalkoxy group, an amino group, an acyl group, a thio group (for example, an alkylthio group, a phenylthio group, a tolylthio group and a pyridylthio group), an amino group (for example, an unsubstituted amino group, a methylamino group, a dimethylamino group and a phenylamino group), a cyano group and a nitro group.

The tetralin ring-containing polyester compound according to the present embodiment can be obtained by synthesis using dicarboxylic acid and a diol or hydroxycarboxylic acid and a zinc compound. When the synthesis is carried out using dicarboxylic acid and diol, a tetralin ring may be contained at least either one of them. In addition, the above dicarboxylic acid, diol and hydroxycarboxylic acid encompass derivatives thereof. Hereinafter, the tetralin ring-containing polyester compound will be described in more detail.

The tetralin ring-containing polyester compound having the constituent unit represented by the above general formula (1) can be obtained by polycondensation of a dicarboxylic acid having a tetralin ring or a derivative (I) thereof and a diol or a derivative (II) thereof using a zinc compound.

Examples of the dicarboxylic acid having a tetralin ring or a derivative (I) thereof include compounds represented by the following general formula (8). The dicarboxylic acids having a tetralin ring or derivatives (I) thereof can be used alone or in combination with two or more.

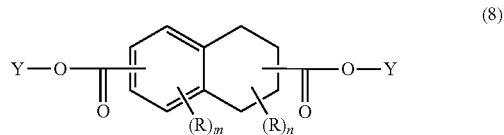

(8)

where R each independently represent a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, which may further have a substituent; m represents an integer of 0 to 3; n represents an integer of 0 to 6, and at least one hydrogen atom is bound to the benzyl position of the tetralin ring; and Y each independently represent a hydrogen atom or an alkyl group.

In the above general formula (8) wherein Y represents an alkyl group, examples of the alkyl group include, but not particularly limited to, a methyl group, an ethyl group, a n-propyl group, an isopropyl group, a t-butyl group, a n-octyl group, a 2-ethylhexyl group, a cyclopropyl group and a cyclopentyl group. In the specification, Y in the general formulas (9), (12) and (13) to be described later are defined as the above Y.

Note that a compound represented by the above general formula (8) can be obtained by reacting, for example, a dicarboxylic acid having a naphthalene ring represented by the following general formula (9) or a derivative thereof with hydrogen.

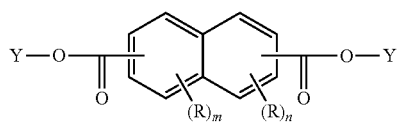
(9)

where R each independently represent at least one monovalent substituent selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, an heterocyclic thio group and an imido group, which may further have a substituent; m each independently represent an integer of 0 to 3; and Y each independently represent a hydrogen atom or an alkyl group.

Examples of the diol or a derivative (II) thereof include ethylene glycol, diethylene glycol, triethylene glycol, polyethylene glycol, propylene glycol, dipropylene glycol, polypropylene glycol, 1,3-propanediol, 2-methyl-1,3-propanediol, 1,3-butanediol, 1,4-butanediol, 1,5-pentanediol, 1,6-hexanediol, 1,7-heptanediol, 1,8-octanediol, 1,9-nonandiol, neopentyl glycol, 1,4-cyclohexanedimethanol, 2-phenylpropanediol, 2-(4-hydroxyphenyl)ethyl alcohol, α,α-dihydroxy-1,3-diisopropylbenzene, α,α-dihydroxy-1,4-diisopropylbenzene, o-xylene glycol, m-xylene glycol, p-xylene glycol, hydroquinone, 4,4-dihydroxyphenyl and naphthalene diol or derivatives of these. Diols or derivatives (II) thereof can be used alone or in combination with two or more.

A tetralin ring-containing polyester compound containing a constituent unit represented by the above general formula (2) can be obtained, for example, by polycondensation of a diol having a tetralin ring or a derivative (III) thereof and a dicarboxylic acid or a derivative (IV) thereof using a zinc compound.

Examples of the diol having a tetralin ring or a derivative (III) thereof include compounds represented by the following general formula (10). The diol having a tetralin ring or derivatives (III) thereof can be used alone or in combination with two or more.

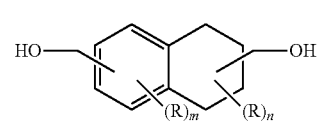
(10)

where R each independently represent at least one monovalent substituent selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, which may further have a substituent; m represents an integer of 0 to 3; n represents an integer of 0 to 6, and at least one hydrogen atom is bound to the benzyl position of the tetralin ring.

Note that a compound represented by the above general formula (10) can be obtained by reacting, for example, a diol having a naphthalene ring represented by the following general formula (11) or a derivative thereof with hydrogen.

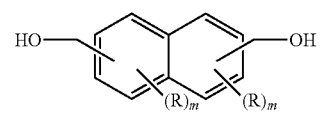
(11)

where R each independently represent at least one monovalent substituent selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, which may further have a substituent; m each independently represent an integer of 0 to 3.

Examples of the dicarboxylic acid or a derivative (IV) thereof include benzene dicarboxylic acids such as oxalic acid, malonic acid, succinic acid, glutaric acid, adipic acid, pimelic acid, suberic acid, azelaic acid, sebacic acid, undecane diacid, dodecane diacid, 3,3-dimethylpentane diacid, phthalic acid, isophthalic acid and terephthalic acid, and naphthalene dicarboxylic acid such as 2,6-naphthalene dicarboxylic acid, anthracene dicarboxylic acid, phenyl malonic acid, phenylene diacetic acid, phenylene dibutyric acid, 4,4-diphenyletherdicarboxylic acid and p-phenylene dicarboxylic acid or derivatives of these. Dicarboxylic acids or derivatives (IV) thereof can be used alone or in combination with two or more.

The tetralin ring-containing polyester compound containing a constituent unit represented by the above general formula (3) or (4) can be obtained, for example, by polycondensation of a hydroxy carboxylic acid having a tetralin ring or a derivative (V) thereof using a zinc compound.

Examples of the hydroxycarboxylic acid having a tetralin ring or a derivative (V) thereof include compounds represented by the following general formula (12) or (13). The hydroxycarboxylic acids having a tetralin ring or derivatives (V) thereof can be used alone or in combination with two or more.

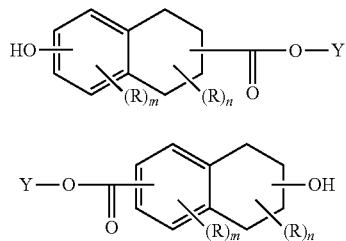

where R each independently represent at least one monovalent substituent selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, which may further have a substituent; m represents an integer of 0 to 3; n represents an integer of 0 to 6, and one hydrogen atom is bound to the benzyl position of the tetralin ring; and Y each independently represent a hydrogen atom or an alkyl group.

A tetralin ring-containing polyester compound containing a constituent unit represented by the above general formula (1) or (2) can be also obtained, for example, by a hydrogenation reaction of a polyester compound containing a constituent unit represented by the following general formula (14) or (15). Also in this case, the polyester compound before the hydrogenation reaction is produced using a zinc compound.

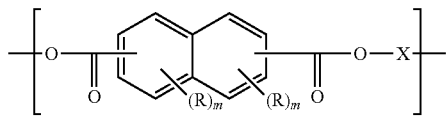

where R each independently represent at least one monovalent substituent selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, which may further have a substituent; m each independently represent an integer of 0 to 3; X represents a divalent group containing at least one group selected from the group consisting of an aromatic hydrocarbon group, a saturated or unsaturated alicyclic hydrocarbon group, a linear or branched and saturated or unsaturated aliphatic hydrocarbon group and a heterocyclic group.

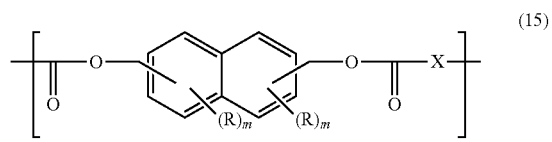

where R each independently represent at least one monovalent substituent selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, which may further have a substituent; m each independently represent an integer of 0 to 3; X represents a divalent group containing at least one group selected from the group consisting of an aromatic hydrocarbon group, a saturated or unsaturated alicyclic hydrocarbon group, a linear or branched and saturated or unsaturated aliphatic hydrocarbon group and a heterocyclic group.

Specific examples of the monovalent substituents represented by R and the divalent group represented by X in the constituent units represented by the above general formulas (8) to (15) are the same as those described in the constituent units represented by the above general formulas (1) to (4). Thus, repetition of explanation is avoided herein.

The tetralin ring-containing polyester compound to be contained in the oxygen-absorbing resin composition of the embodiment may contain another constituent unit having a tetralin ring other than the constituent units represented by the above general formulas (1) to (4) and/or a constituent unit having no tetralin ring as a copolymerization component(s). Specifically, the compounds mentioned above as a diol or a derivative (II) thereof and exemplified in a dicarboxylic acid or a derivative (IV) thereof can be used as the copolymerization component(s).

As more preferable compounds among the tetralin ring-containing polyester compounds containing a constituent unit represented by the above general formula (1), tetralin ring-containing polyester compounds containing constituent units represented by the above formulas (5) to (7) and tetralin ring-containing polyester compounds containing constituent units represented by the following formulas (16) to (18) are mentioned. When the tetralin ring-containing polyester compound contains the constituent unit represented by the above formulas (5) to (7) or the constituent unit represented by the following formulas (16) to (18), raw material costs tend to be able to be cut down.

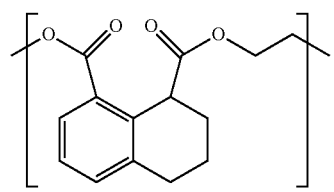

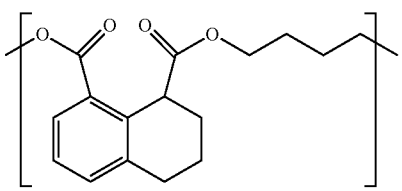

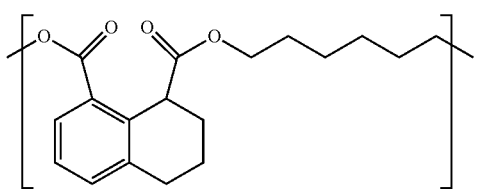

(18)

The molecular weight of the tetralin ring-containing polyester compounds according to the present embodiment can be appropriately specified in consideration of desired performance, handling property, etc., and is not particularly limited. Generally, the weight average molecular weight (Mw) is preferably from $1.0 \times 10^3$ or higher to $8.0 \times 10^6$ or lower and more preferably from $5.0 \times 10^3$ or higher to $5.0 \times 10^6$ or lower. Similarly, the number average molecular weight (Mn) thereof is preferably from $1.0 \times 10^3$ or higher to $1.0 \times 10^6$ or lower and more preferably from $5.0 \times 10^3$ or higher to $5.0 \times 10^4$ or lower. Note that the molecular weights used herein each refer to a polystyrene equivalent value. Note that the above tetralin ring-containing polyester compounds can be used alone or in combination with two or more.

The glass transition temperature (Tg) of a tetralin ring-containing polyester compound according to the present embodiment, which is not particularly limited, is preferably from 0° C. or higher to 90° C. or lower and more preferably from 10° C. or higher to 80° C. or lower. If a glass transition temperature is within the above preferable range, pelletization during the production and drying become easier and the oxygen-absorbing performance tends to be able to be more enhanced, compared to the case where the glass transition temperature does not satisfy the above condition. Note that the glass transition temperature herein refers to a value measured by differential scanning calorimetry.

A method for producing a tetralin ring-containing polyester compound according to the present embodiment is not particularly limited except that a zinc compound is used and any one of methods for producing a polyester conventionally known can be applied. Examples of the method for producing a polyester include a melt polymerization method such as a transesterification method, a direct esterification method, a solution polymerization method or the like. Of them, a transesterification method or a direct esterification method is preferable since raw materials are easily obtained.

A zinc compound is added during the production of the tetralin ring-containing polyester compound. For example, when a transesterification method is employed as a production method of polyester, a zinc compound may be added during the transesterification step, added during the subsequent polycondensation step or added during both steps.

The zinc compound can be used by appropriately selecting from known compounds and is not particularly limited. Specific examples of the zinc compound include organic acid salts, halides, phosphates, phosphites, hypophosphites, nitrates, sulfates, carbonates, oxides, hydroxides, alkoxides, and complex compounds of zinc. Examples of the organic acid of organic acid salt include, but not limited to, acetic acid, propionic acid, octanoic acid, lauric acid, stearic acid, acetylacetone, dimethyldithiocarbamic acid, palmitic acid, 2-ethylhexanoic acid, neodecanoic acid, linolic acid, tall acid, oleic acid, capric acid and naphthenic acid. Of the above, in view of the catalytic action to the oxygen-absorbing reaction, organic acid salts, carbonates, oxides, hydroxides of zinc, zinc alkoxides and zinc halides are preferred, and zinc acetate, zinc stearate, zinc carbonate, zinc oxide and zinc chloride are more preferred. Note that the zinc compounds can be used alone or in combination with two or more.

The content of zinc compound can be appropriately specified depending upon the types of the polyester compound and zinc compound to be used and the desired performances thereof, and is not particularly limited. In view of the amount of oxygen absorbed of oxygen-absorbing resin composition, the content of a zinc compound in the oxygen-absorbing resin composition is preferably from 0.001 parts by mass or more to 1 part by mass or less in terms of a zinc metal based on 100 parts by mass of the above polyester compound, and more preferably from 0.0015 parts by mass or more to 0.2 parts by mass or less, and further preferably 0.002 parts by mass or more to 0.1 parts by mass or less.

In producing a tetralin ring-containing polyester compound, in addition to a zinc compound, a catalyst such as a transesterification catalyst, an esterification catalyst and a polycondensation catalyst, a conventional stabilizer such as an etherification inhibitor, a heat stabilizer and a photo stabilizer, and a conventional polymerization moderator, and the like may be used. The types and use amounts of these may be appropriately selected depending upon the reaction rate, the molecular weight of a tetralin ring-containing polyester compound, glass transition temperature, viscosity, color tone, safety, heat stability, weather resistance, elution properties themselves, and the like and are not particularly limited. Examples of the catalyst as mentioned above include compounds of metals such as lead, cerium, cadmium, manganese, cobalt, lithium, sodium, potassium, calcium, nickel, magnesium, vanadium, aluminum, titanium, antimony and tin (for example, a fatty acid salt, a carbonate, a phosphate, a hydroxide, a chloride, an oxide, and an alkoxide) and magnesium metal. These can be used alone or in combination with two or more.

Note that the limiting viscosity of a tetralin ring-containing polyester compound, which is not particularly limited, is preferably from 0.1 dL/g or higher to 2.0 dL/g or lower and more preferably from 0.5 dL/g or higher to 1.5 dL/g or lower in view of moldability of the tetralin ring-containing polyester compound. Note that the limiting viscosity is a measurement value at 25° C. using a solvent mixture containing phenol and 1,1,2,2-tetrachloroethane in a mass ratio of 6:4.

The above tetralin ring-containing polyester compounds all have hydrogen at the benzyl position of the tetralin ring. Since the hydrogen at the benzyl position is removed by using a tetralin ring-containing polyester compound in combination with a transition metal catalyst as mentioned above, thereby oxygen-absorbing performance is exhibited. In the present embodiment, it is presumed that the oxygen-absorbing performance is significantly improved when a zinc compound is added during the production of the tetralin ring-containing polyester compound, wherein the zinc compound remained in the resin composition serves as a cocatalyst of the transition metal catalyst. The reason for rendering the above effect is not clear, but it is presumed that the zinc compound added during the production of the polyester compound forms a sort of complex, which functions as a cocatalyst.

The oxygen-absorbing resin composition of the embodiment is significantly suppressed in odor generation after absorption of oxygen. The reason is not elucidated; however, for example, the following oxidation reaction mechanism is presumable. In the tetralin ring-containing polyester compound as mentioned above, first hydrogen at the benzyl position of the tetralin ring is removed to produce a radical. The radical then reacts with oxygen to oxidize carbon at the benzyl position. In this manner, a hydroxy group or a ketone group is considered to be produced. Because of this, it is presumed that, in the oxygen-absorbing resin composition of the embodiment, a molecular chain of a main oxygen-absorbing component is not cut by an oxidation reaction as is in the prior art and the structure of a tetralin ring-containing polyester compound is maintained, with the result that a low molecular weight organic compound serving as a cause of odor is rarely produced after absorption of oxygen.

[Transition Metal Catalyst]

As the transition metal catalyst to be contained in the oxygen-absorbing resin composition of the embodiment, any catalyst known in the art can be appropriately selected and used as long as it can serve as a catalyst for the oxidation reaction of a tetralin ring-containing polyester compound as mentioned above. The transition metal catalyst is not particularly limited.

Specific examples of a transition metal catalyst include organic acid salts, halides, phosphates, phosphites, hypophosphites, nitrates, sulfates, oxides and hydroxides of transition metals. Examples of the transition metal to be contained in the transition metal catalyst include, but not limited to, titanium, vanadium, chromium, manganese, iron, cobalt, nickel, copper, zinc, ruthenium and rhodium. Of these, in view of the catalytic action to the oxygen-absorbing reaction, manganese, iron, cobalt, nickel and copper are preferred. Examples of the organic acid of organic acid salt include, but not limited to, acetic acid, propionic acid, octanoic acid, lauric acid, stearic acid, acetylacetone, dimethyldithiocarbamic acid, palmitic acid, 2-ethylhexanoic acid, neodecanoic acid, linolic acid, tall acid, oleic acid, capric acid and naphthenic acid. The transition metal catalyst is preferably an organic acid salt in which the above transition metal and organic acid are combined, and the organic acid salts, in which manganese, iron, cobalt, nickel or copper as the transition metal and acetic acid, stearic acid, 2-ethylhexanoic acid, oleic acid or naphthenic acid as the organic acid are combined, are more preferable. Note that transition metal catalysts can be used alone or in combination with two or more.

In the oxygen-absorbing resin composition of the embodiment, the content rate of a tetralin ring-containing polyester compound and a transition metal catalyst, which can be appropriately specified depending upon the types of tetralin ring-containing polyester compound and transition metal catalyst to be used and the desired performances thereof, is not particularly limited. In view of the amount of oxygen absorbed of oxygen-absorbing resin composition, the content of a transition metal catalyst is preferably from 0.001 parts by mass or more to 10 parts by mass or less in terms of transition metal based on 100 parts by mass of a tetralin ring-containing polyester compound, and more preferably from 0.002 parts by mass or more to 2 parts by mass or less, and further preferably from 0.005 parts by mass or more to 1 part by mass or less.

The tetralin ring-containing polyester compound and the transition metal catalyst can be mixed by a method known in the art. If these are kneaded by use of an extruder, an oxygen-absorbing resin composition having higher dispersibility can be obtained.

[Additives]

The oxygen-absorbing resin composition of the present embodiment herein may contain additives known in the art other than the aforementioned components as optional components, as long as the effect of the embodiment is not excessively damaged. Examples of such optional components include, but not particularly limited to, additives such as a drying agent, a pigment such as titanium oxide, a dye, an antioxidant, a slipping agent, an antistatic agent, a plasticizer and a stabilizer; fillers such as calcium carbonate, clay, mica and silica; and a deodorant.

The oxygen-absorbing resin composition of the embodiment may further contain a radical generator and a photo initiator, if necessary, in order to facilitate an oxygen absorption reaction. Specific examples of the radical generator include various types of N-hydroxy imide compounds. Specific examples thereof include, but not particularly limited to, N-hydroxysuccinimide, N-hydroxymaleimide, N,N'-dihydroxycyclohexanetetracarboxydiimide, N-hydroxyphthalimide, N-hydroxytetrachlorophthalimide, N-hydroxytetrabromophthalimide, N-hydroxyhexahydrophthalimide, 3-sulfonyl-N-hydroxyphthalimide, 3-methoxycarbonyl-N-hydroxyphthalimide, 3-methyl-N-hydroxyphthalimide, 3-hydroxy-N-hydroxyphthalimide, 4-nitro-N-hydroxyphthalimide, 4-chloro-N-hydroxyphthalimide, 4-methoxy-N-hydroxyphthalimide, 4-dimethylamino-N-hydroxyphthalimide, 4-carboxy-N-hydroxyhexahydrophthalimide, 4-methyl-N-hydroxyhexahydrophthalimide, N-hydroxyhetimide, N-hydroxyhimimide, N-hydroxytrimellitimide and N,N-dihydroxypyromellitdiimide. Specific examples of the photo initiator include, but not particularly limited to, benzophenone and a derivative thereof, a thiazine dye, a metal porphyrin derivative and an anthraquinone derivative. Note that these radical generators and photo initiators can be used alone or in combination with two or more.

[Other Thermoplastic Resin]

The oxygen-absorbing resin composition of the present embodiment, if necessary, may further contain another thermoplastic resin other than a tetralin ring-containing polyester compound as mentioned above, as long as the effect of the embodiment is not excessively damaged. If another thermoplastic resin is used in combination, moldability and handling property can be enhanced.

As another thermoplastic resin, those known in the art can be appropriately used. Specific examples thereof include, but not limited to, polyolefins such as random or block copolymers of α-olefins such as a low-density polyethylene, a medium-density polyethylene, a high-density polyethylene, a linear and low-density polyethylene, a linear and extremely low-density polyethylene, a polypropylene, poly-1-butene, poly-4-methyl-1-pentene or ethylene, propylene, 1-butene, and 4-methyl-1-pentene; acid-modified polyolefins such as maleic anhydride-grafted polyethylene and maleic anhydride-grafted polypropylene; ethylene-vinyl compound copolymers such as an ethylene-vinyl acetate copolymer, an ethylene-vinyl alcohol copolymer, an ethylene-vinyl chloride copolymer, an ethylene-(meth)acrylate copolymer, an ion crosslinked product (ionomer) thereof and an ethylene-methyl methacrylate copolymer; styrene resins such as polystyrene, an acrylonitrile-styrene copolymer and an α-methylstyrene-styrene copolymer; polyvinyl compounds such as poly(methyl acrylate) and poly(methyl methacrylate); polyamides such as nylon 6, nylon 66, nylon 610, nylon 12, poly(metaxylylene adipamide) (MXD6); polyesters such as poly(ethylene terephthalate) (PET), poly(butylene terephthalate) (PBT), poly(trimethylene terephthalate) (PTT), poly(ethylene naphthalate) (PEN), glycol-modified poly(ethylene terephthalate) (PETG), poly(ethylene succinate) (PES), poly(butylene succinate) (PBS), polylactate, polyglycolate, polycaprolactone and polyhydroxyalkanoate; polycarbonates; polyethers such as polyethylene oxide; and mixtures of these. These thermoplastic resins can be used alone or in combination with two or more.

[Usage]

To the oxygen-absorbing resin composition of the embodiment, a known granulation method or a known molding method such as an extrusion molding can be applied. The composition is molded into, for example, powdery, granular, pellet, film or sheet-forms or other small-piece forms. The oxygen-absorbing resin molded article thus obtained can be used directly as an oxygen absorbent. Alternatively, if the obtained oxygen-absorbing resin molded article is packed in an air-permeable packaging material, the molded article can also be used as an oxygen absorbent packaging body. Furthermore, if the oxygen-absorbing resin composition of the embodiment is molded into film-form or sheet-form, the molded article can also be used in the form of a label, a card, a packing, and the like. Note that a molded article having a thickness from 0.1 μm or thicker to 500 μm or thinner is specified as a film, whereas a molded article having a thickness exceeding 500 μm is specified as a sheet.

It is preferable that a pellet-form oxygen-absorbing resin molded article herein is further ground into powdery grains when used in order to increase the contact area with oxygen to thereby effectively deliver oxygen-absorbing performance.

Note that as the air-permeable packaging material, which is not particularly limited, a known packaging material having air permeability can be applied. In view of sufficiently exerting the oxygen absorption effect, an air-permeable packaging material having high air permeability is preferred. Specific examples of the air-permeable packaging material include, but not particularly limited to, highly air-permeable packaging materials used in various usages, including paper sheets such as Japanese paper, machine-made paper and rayon paper; non-woven clothes using various types of fibers obtained from pulp, cellulose and a synthetic resin; a plastic film or a porous plastic film; or a microporous film obtained by adding calcium carbonate etc., followed by drawing it; and a laminate obtained by stacking two types or more selected from these. As the plastic film, laminate films, each formed by laminating and attaching a film of e.g., a polyethylene terephthalate, a polyamide, a polypropylene or a polycarbonate film and a film serving as a sealing film and formed of a polyethylene, an ionomer, a polybutadiene, an ethylene acrylate copolymer, an ethylene methacrylate copolymer or an ethylene vinyl acetate copolymer, can be used.

Note that if the oxygen-absorbing resin composition of the present embodiment is molded into a film form or a sheet form and put in use, it is preferable to form micro voids in the film or the sheet, for example, by drawing after molded. Owing to this operation, the oxygen permeability of the film or sheet can be further enhanced, with the result that the oxygen-absorbing performance of the tetralin ring-containing polyester compound tends to be extremely effectively delivered.

The oxygen-absorbing resin composition of the embodiment molded into a film form or a sheet form can be not only used as a packaging material or a packaging container in the form of a single-layer form but also used in combination with another substrate in the form of a laminate. Typical example of such a laminate is a laminate obtained by stacking at least one layer formed of the oxygen-absorbing resin composition of the embodiment and at least one layer selected from other resin layers, paper substrate layers or metal foil layers. This laminate can be used as an oxygen-absorbing multi-layer packaging material and an oxygen-absorbing multi-layer packaging container. Note that generally, the oxygen-absorbing resin composition (layer) of the embodiment molded into a film form or a sheet form is preferably provided to an interior side rather than the outer surface of a container etc. so as not to be exposed at the outer surface of the container etc. In view of avoiding direct contact with the content of a container, the oxygen-absorbing resin composition (layer) of the embodiment molded into a film form or a sheet form is preferably provided outer than the inner surface of the container etc. Likewise, in using the oxygen-absorbing resin composition (layer) of the embodiment in a multilayer body, it is preferable that the composition is molded into a film form or a sheet form and arranged as at least one intermediate layer.

Examples of one preferable aspect of the laminate mentioned above include an oxygen-absorbing multilayer body having at least three layers, i.e., a sealant layer containing a thermoplastic resin, an oxygen-absorbing layer containing the oxygen-absorbing resin composition of the embodiment and a gas barrier layer containing a gas barrier substance, in this order. The phrase "having at least three layers . . . in this order" means that the sealant layer, oxygen-absorbing layer and gas barrier layer are arranged in this order; and is a concept including not only an aspect where a sealant layer, an oxygen-absorbing layer and a gas barrier layer are directly stacked (hereinafter, expressed as a "sealant layer/oxygen-absorbing layer/gas barrier layer") but also an aspect where one or more other layers such as a resin layer, a metal foil layer or an adhesive layer are interposed between a sealant layer and an oxygen-absorbing layer or between an oxygen-absorbing layer and a gas barrier layer (hereinafter, referred to as an "intermediate layer") (for example, "sealant layer/resin layer/oxygen-absorbing layer/adhesion layer/gas barrier layer", and "sealant layer/resin layer/adhesion layer/oxygen-absorbing layer/adhesion layer/resin layer/adhesion layer/gas barrier layer/adhesion layer/support") (the same applied hereinafter without an exception).

Examples of another preferable aspect of the laminate mentioned above include an oxygen-absorbing multilayer body having at least three layers, i.e., a sealant layer having a polyolefin resin, an oxygen-absorbing layer containing the oxygen-absorbing resin composition of the embodiment and a gas barrier layer containing a gas barrier substance in this order.

As the thermoplastic resin and polyolefin resin used in the sealant layer, it is preferable that are appropriately selected in consideration of compatibility with other layers (oxygen-absorbing layer, gas barrier layer, resin layer, adhesive layer, support, etc.) in adjacent to the other layer.

As the gas barrier substance to be used as a gas barrier layer, a gas barrier thermoplastic resin, a gas barrier thermosetting resin, silica, alumina, aluminum, etc., (as vapor deposition films) and a metal (as aluminum in the form of foil) can be used. Examples of the gas barrier thermoplastic resin include an ethylene-vinyl alcohol copolymer, MXD6 and poly(vinylidene chloride). As the gas barrier thermosetting resin, a gas barrier epoxy resin, for example, the trade name of "MAXIVE" manufactured by Mitsubishi Gas Chemical Company, Inc., can be mentioned.

As a method for manufacturing an oxygen-absorbing multilayer body as mentioned above, which is not particularly limited, known methods such as a coextrusion method, a laminating method and a coating method can be applied depending upon e.g., the properties of the material, purpose of processing and processing step. For example, a film or a sheet can be formed by a manufacturing method of extruding a molten resin composition from an extruder provided with e.g., a T die and a circular die or by a method of applying an adhesive to an oxygen-absorbing film or a sheet and adhering it to another film or sheet.

For example, a film-form oxygen-absorbing multilayer body can be further processed into a bag-form or a cover material. For example, a sheet-form oxygen-absorbing multilayer body is thermoformed into an oxygen-absorbing multilayer container of a predetermined shape such as a tray, a cup, a bottle and a tube by a molding method such as vacuum molding, air-pressure forming and plug assist molding. The thus obtained bag-form container and cup-form container can be subjected to a boiling treatment performed at 80 to 100° C., a semi-retort, a retort or a high retort treatment performed at 100 to 135° C. The bag-form container, if it is filled with stuff such as food and an open hole is provided, can be preferably used as a pouch for microwave cooking provided with a hole for easily releasing water vapor during microwave cooking.

(Oxygen-Absorbing Multilayer Injection-Molded Article)

The oxygen-absorbing multilayer injection-molded article of the present embodiment at least has an oxygen-absorbing layer (layer A) formed of an oxygen-absorbing resin composition and a resin layer (layer B) containing a thermoplastic resin (b).

The oxygen-absorbing multilayer injection-molded article of the present embodiment and a container obtained by secondary processing of the article can absorb oxygen within the container (even if the amount of oxygen transmitting or coming into the container from the outside through the wall of the container is small, transmitting or incoming oxygen is also absorbed) to prevent deterioration etc. of the content (article to be packed) stored therein by oxygen. At this time, the injection-molded article of the present embodiment may be molded itself into a container shape. In consideration of the oxygen-absorbing performance delivered by the oxygen-observing multilayer injection-molded article of the present embodiment, a preservation container such as cup form containers (injection cups) and bottle-form containers are preferable.

The layer constitution of the oxygen-absorbing multilayer injection-molded article of the embodiment is not particularly limited and the number and types of oxygen-absorbing layers (layer A) and resin layers (layer B) are not particularly limited. For example, the multilayer body may be constituted of A/B, i.e., formed of a single-layer A and single-layer B; may be constituted of three layers (B/A/B), i.e., formed of a single-layer A and two layers B; or alternatively may be constituted of five layers (B1/B2/A/B2/B1), i.e., formed of a single-layer A and, two layers B1 and two layers B2. Furthermore, the multilayer injection-molded article of the embodiment may contain, if necessary, an optional layer such as an adhesion layer (layer AD). The multilayer body may be constituted of seven layers (for example, B1/AD/B2/A/B2/AD/B1).

[Oxygen-Absorbing Layer (Layer A)]

In the oxygen-absorbing multilayer injection-molded article of the present embodiment, the oxygen-absorbing layer (layer A) is formed of an oxygen-absorbing resin composition containing a polyester compound containing at least one constituent unit having a tetralin ring selected from the group consisting of the constituent units represented by the above general formulas (1) to (4) and a transition metal catalyst.

The content rate of the tetralin ring-containing polyester compound in layer A, which is not particularly limited, is preferably 50% by mass or more based on the total amount of layer A, more preferably 70% by mass or more and further preferably 90% by mass or more. If the content rate of a tetralin ring-containing polyester compound is 50% by mass or more, the oxygen-absorbing performance tends to be more enhanced.

In the oxygen-absorbing multilayer injection-molded article of the embodiment, the thickness of the oxygen-absorbing layer (layer A), which can be appropriately specified depending upon the use and desired performance, is not particularly limited; however, the thickness is preferably from 1 µm or thicker to 1000 µm or thinner, more preferably from 2 µm or thicker to 800 µm or thinner and further preferably from 5 µm or thicker to 700 µm or thinner. If the thickness falls within the preferable range mentioned above, the performance of layer A to absorb oxygen can be more enhanced and processability and economic aspect tend to be maintained at high levels.

[Resin Layer (Layer B) Containing a Thermoplastic Resin]

The resin layer (layer B) in the oxygen-absorbing multilayer injection-molded article of the embodiment is a layer containing a thermoplastic resin. The content rate of the thermoplastic resin in layer B, which can be appropriately specified, is not particularly limited; however, the content is preferably from 70% by mass or more to 100% by mass or less based on the total amount of layer B, more preferably from 80% by mass or more to 100% by mass or less and further preferably from 90% by mass or more to 100% by mass or less.

The oxygen-absorbing multilayer injection-molded article of the embodiment may have a plurality of layers B and the constitutions of plural layers B may be the same or different. The thickness of layer B, which can be appropriately specified depending upon the use, is not particularly limited; however, the thickness is preferably from 5 µm or thicker to 1000 µm or thinner, more preferably from 10 µM or thicker to 800 µm or thinner and further preferably from 20 µM or thicker to 500 µM or thinner, in view of ensuring physical properties required for a multilayer injection-molded article such as strength including drop resistance and flexibility.

As the thermoplastic resin to be used in layer B, any thermoplastic resin can be used, in other words, the thermoplastic resin to be used in layer B is not particularly limited. Specifically, thermoplastic resins as exemplified above are mentioned. In particular, the thermoplastic resin to be used in layer B of the embodiment is preferably at least one selected from the group consisting of a polyolefin, a polyester, a polyamide, an ethylene-vinyl alcohol copolymer, a plant-derived resin and a chlorine resin. Specific examples of the resins preferably used include those exemplified as the thermoplastic resins preferably used in the layer B below. The thermoplastic resin to be used in layer B of the embodiment preferably contains a thermoplastic resin other than a tetralin ring-containing polyester compound, in an amount from 50% by mass or more to 100% by mass or less based on the total amount of thermoplastic resins contained in the layer B, more preferably from 70% by mass or more to 100% by mass or less and further preferably from 90% by mass or more to 100% by mass or less.

Now, examples of the thermoplastic resin preferably used in layer B of the oxygen-absorbing multilayer body of the embodiment will be mentioned below.

[Polyolefin]

Specific examples of the polyolefin to be used in layer B of the oxygen-absorbing multilayer body of the embodiment include polyethylenes such as a low-density polyethylene, a medium-density polyethylene, a high-density polyethylene, a linear and low-density polyethylene, and a linear and extremely low-density polyethylene; olefin homopolymers such as a polypropylene, polybutene-1 and poly-4-methylpentene-1; ethylene and $\alpha$-olefin copolymers such as an ethylene-propylene random copolymer, an ethylene-propylene block copolymer, an ethylene-propylene-polybutene-1 copolymer and an ethylene-cyclic olefin copolymer; other ethylene copolymers such as an ethylene-$\alpha,\beta$-unsaturated carboxylic acid copolymer such as ethylene-(meth)acrylate copolymer, an ethylene-$\alpha,\beta$-unsaturated carboxylic acid ester copolymer such as an ethylene-ethyl (meth)acrylate copolymer, ion crosslinked compound of ethylene-$\alpha,\beta$-unsaturated carboxylic acid copolymer and an ethylene-vinyl acetate copolymer; open-ring polymers of a cyclic olefin and hydrogenated compounds thereof; cyclic olefin-ethylene copolymers; and graft-modified polyolefins obtained by modifying these polyolefins with an acid anhydride such as maleic anhydride.

[Polyester]

The polyester that will be described below is a polyester exemplified as a thermoplastic resin for layer B and does not contain a tetralin ring-containing polyester compound. As specific examples of the polyester to be used in layer B of the oxygen-absorbing multilayer body of the embodiment, those formed of one or two or more compounds selected from polyvalent carboxylic acids containing a dicarboxylic acid and ester-forming derivatives of these and one or two or more compounds selected from polyhydric alcohols including a glycol; those formed of hydroxy carboxylic acids and ester-forming derivative of these; or those formed of cyclic esters are mentioned. Ethylene terephthalate thermoplastic polyester is preferably a polyester in which a most part of ester repeat units, generally 70 mole % or more thereof, is occupied by an ethylene terephthalate unit and having a glass transition point (Tg) within the range from 50° C. or higher to 90° C. or lower and a melting point (Tm) within the range from 200° C. or higher to 275° C. or lower. As an ethylene terephthalate thermoplastic polyester, a polyethylene terephthalate is particularly excellent in pressure resistance, heat resistance, thermal pressure resistance, etc. A polyester copolymer containing a small amount of ester unit formed of a dicarboxylic acid such as isophthalic acid and a naphthalene dicarboxylic acid and a diol such as propylene glycol, other than the ethylene terephthalate unit, can also be used.

Specific examples of the dicarboxylic acid include saturated aliphatic dicarboxylic acids such as oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid and dimer acid or ester-forming derivatives of these; unsaturated aliphatic dicarboxylic acids such as fumaric acid, maleic acid and itaconic acid or ester-forming derivatives of these; naphthalenedicarboxylic acids such as orthophthalic acid, isophthalic acid, terephthalic acid, 1,3-naphthalenedicarboxylic acid, 1,4-naphthalenedicarboxylic acid, 1,5-naphthalenedicarboxylic acid, 2,6-naphthalenedicarboxylic acid and 2,7-naphthalenedicarboxylic acid; aromatic dicarboxylic acids such as 4,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid and anthracenedicarboxylic acid or ester-forming derivatives of these; and metal sulfonate group-containing aromatic dicarboxylic acids such as 5-sodium sulfo-isophthalic acid, 2-sodium sulfo-terephthalic acid, 5-lithium sulfo-isophthalic acid, 2-lithium sulfo-terephthalic acid, 5-potassium sulfo-isophthalic acid and 2-potassium sulfo-terephthalic acid or lower alkyl ester derivatives of these.

Of the aforementioned dicarboxylic acids, particularly, terephthalic acid, isophthalic acid and naphthalene dicarboxylic acid are preferable in view of the physical properties etc. of the polyesters to be obtained. Note that, if necessary, other dicarboxylic acids may be copolymerized.

Specific examples of the polyvalent carboxylic acids other than these dicarboxylic acids include ethane tricarboxylic acid, propane tricarboxylic acid, butane tetracarboxylic acid, pyromellitic acid, trimellitic acid, trimesic acid, 3,4,3',4'-biphenyltetracarboxylic acid and ester-forming derivatives of these.

Specific examples of the glycol include aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexane dimethanol, 1,3-cyclohexane dimethanol, 1,4-cyclohexane dimethanol, 1,4-cyclohexane diethanol, 1,10-dacamethylene glycol, 1,12-dodecane diol, polyethylene glycol, poly(trimethylene glycol) and poly(tetramethylene glycol); and aromatic glycols such as hydroquinone, 4,4'-dihydroxy bisphenol, 1,4-bis($\beta$-hydroxyethoxy)benzene, 1,4-bis($\beta$-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol C, 2,5-naphthalene diol and glycols formed by adding an ethylene oxide to these glycols.

Of the glycols mentioned above, particularly, ethylene glycol, 1,3-propylene glycol, 1,4-butylene glycol, and 1,4-cyclohexane dimethanol are preferably used as a main component.

Specific examples of the polyhydric alcohols other than these glycols include trimethylol methane, trimethylol ethane, trimethylol propane, pentaerythritol, glycerol and hexane triol.

Specific examples of the hydroxy carboxylic acid include, lactic acid, citric acid, malic acid, tartaric acid, hydroxyacetic acid, 3-hydroxybutyrate, p-hydroxybenzoate, p-(2-hydroxyethoxy)benzoate, 4-hydroxycyclohexanecarboxylic acid and ester-forming derivatives of these.

Specific examples of the cyclic esters include $\epsilon$-caprolactone, $\beta$-propiolactone, $\beta$-methyl-$\beta$-propiolactone, $\delta$-valerolactone, glycolide and lactide.

Specific examples of the ester-forming derivatives of a polyvalent carboxylic acid and a hydroxy carboxylic acid include alkyl esters, acid chlorides and acid anhydrides of these.

Of the aforementioned ones, a polyester containing terephthalic acid or an ester-forming derivative thereof or a naphthalene dicarboxylic acid or an ester-forming derivative thereof as a main acid component and an alkylene glycol as a main glycol component is preferable.

Note that the polyester containing terephthalic acid or an ester-forming derivative thereof as a main acid component is a polyester preferably containing the terephthalic acid or ester-forming derivatives thereof in total in an amount of 70 mole % or more based on the total of the acid components, more preferably in an amount of 80 mole % or more and further preferably in an amount of 90 mole % or more. Similarly, the polyester containing a naphthalene dicarboxylic acid or an ester-forming derivative thereof as a main acid component is a polyester preferably containing naphthalene dicarboxylic acids or ester-forming derivatives thereof in total in an amount of 70 mole % or more, more preferably in an amount of 80 mole % or more and further preferably in an amount of 90 mole % or more.

Of the aforementioned naphthalene dicarboxylic acids or ester-forming derivatives of these, dicarboxylic acids exemplified above such as 1,3-naphthalene dicarboxylic acid, 1,4-naphthalene dicarboxylic acid, 1,5-naphthalene dicarboxylic acid, 2,6-naphthalene dicarboxylic acid and 2,7-naphthalene dicarboxylic acid or ester-forming derivatives of these are preferable.

The aforementioned polyester, in which the main glycol component is an alkylene glycol, is a polyester containing alkylene glycols in total preferably in an amount of 70 mole % or more based on the total of the glycol components, more preferably in an amount of 80 mole % or more and further preferably in an amount of 90 mole % or more. Note that the alkylene glycols herein may contain a substituent and an alicyclic structure in the molecular chain.

A copolymerization component other than the aforementioned terephthalic acid/ethylene glycol, in view of attaining transparency and moldability at the same time, is preferably at least one selected from the group consisting of isophthalic acid, 2,6-naphthalene dicarboxylic acid, diethylene glycol, neopentyl glycol, 1,4-cyclohexanedimethanol, 1,2-propanediol, 1,3-propanediol and 2-methyl-1,3-propanediol, and more preferably at least one selected from the group consisting of isophthalic acid, diethylene glycol, neopentyl glycol and 1,4-cyclohexane dimethanol.

A preferable example as the polyester to be used in layer B of the oxygen-absorbing multilayer body of the embodiment is a polyester having a main repeat unit constituted of ethylene terephthalate, more preferably a linear polyester containing an ethylene terephthalate unit in an amount of 70 mole % or more, further preferably a linear polyester containing an ethylene terephthalate unit in an amount of 80 mole % or more and particularly preferably a linear polyester containing an ethylene terephthalate unit in an amount of 90 mole % or more.

Another preferable example as the polyester to be used in layer B of the oxygen-absorbing multilayer body of the embodiment is a polyester having a main repeat unit constituted of ethylene-2,6-naphthalate, more preferably a linear polyester containing ethylene-2,6-naphthalate unit in an amount of 70 mole % or more, further preferably a linear polyester containing ethylene-2,6-naphthalate unit in an amount of 80 mole % or more and particularly preferably a linear polyester containing ethylene-2,6-naphthalate unit in an amount of 90 mole % or more.

Another preferable example as the polyester to be used in layer B of the oxygen-absorbing multilayer body of the embodiment is a linear polyester containing a propylene terephthalate unit in an amount of 70 mole % or more, a linear polyester containing a propylene naphthalate unit in an amount of 70 mole % or more, a linear polyester containing a 1,4-cyclohexanedimethylene terephthalate unit in an amount of 70 mole % or more, a linear polyester containing a butylene naphthalate unit in an amount of 70 mole % or more or a linear polyester containing a butylene terephthalate unit in an amount of 70 mole % or more.

In view of attaining transparency and moldability at the same time, a particularly preferable polyester of the above, in other words, a particularly preferable combination of components constituting a total polyester, includes a combination of terephthalic acid/isophthalic acid/ethylene glycol, a combination of terephthalic acid/ethylene glycol/1,4-cyclohexane dimethanol and a combination of terephthalic acid/ethylene glycol/neopentyl glycol. Note that, needless to say, the polyesters mentioned above may inevitably contain diethylene glycol, which is produced by dimerization of ethylene glycols during an esterification (transesterification) reaction and a polycondensation reaction, in a small amount (5 mole % or less).

Another preferable example as the polyester to be used in layer B of the oxygen-absorbing multilayer body of the embodiment is poly(glycolic acid), which is obtained through polycondensation of a glycolic acid and methyl glycolate or ring-opening polycondensation of glycolide. Note that the poly(glycolic acid) may be copolymerized with another component such as lactide.

[Polyamide]

Specific examples of the polyamide to be used in layer B of the oxygen-absorbing multilayer body of the embodiment include polyamides containing a unit derived from a lactam or an aminocarboxylic acid as a main constituent unit; aliphatic polyamides containing a unit derived from an aliphatic diamine and an aliphatic dicarboxylic acid as a main constituent unit; partially aromatic polyamides containing a unit derived from an aliphatic diamine and an aromatic dicarboxylic acid as a main constituent unit; and partially aromatic polyamides containing a unit derived from an aromatic diamine and an aliphatic dicarboxylic acid as a main constituent unit. Note that the polyamides herein may be, if necessary, copolymerized with a monomer unit other than a main constituent unit.

Specific examples of the lactam or aminocarboxylic acid include lactams such as ε-caprolactam and laurolactam; aminocarboxylic acids such as aminocaproic acid and aminoundecanoic acid; and aromatic aminocarboxylic acids such as para-aminomethylbenzoic acid.

Specific examples of the aliphatic diamine include aliphatic diamines having 2 to 12 carbon atoms or functional derivatives thereof and alicyclic diamines. Note that the aliphatic diamines may be linear aliphatic diamines or branched aliphatic diamines. Specific examples of the linear aliphatic diamines include aliphatic diamines such as ethylenediamine, 1-methylethylenediamine, 1,3-propylenediamine, tetramethylenediamine, pentamethylenediamine, hexamethylenediamine, heptamethylenediamine, octamethylenediamine, nonamethylenediamine, dacamethylenediamine, undecamethylenediamine and dodecamethylenediamine. Specific examples of the alicyclic diamines include cyclohexanediamine, 1,3-bis(aminomethyl)cyclohexane and 1,4-bis(aminomethyl)cyclohexane.

Specific examples of the aliphatic dicarboxylic acid include linear aliphatic dicarboxylic acids and alicyclic dicarboxylic acids. In particular, linear aliphatic dicarboxylic acids having an alkylene group of 4 to 12 carbon atoms are preferable. Examples of the linear aliphatic dicarboxylic acids include adipic acid, sebacic acid, malonic acid, succinic acid, glutaric acid, pimelic acid, suberic acid, azelaic acid, undecanoic acid, undecadioic acid, dodecanedioic acid, dimeric acid and functional derivatives of these. Examples of the alicyclic dicarboxylic acids include 1,4-cyclohexane dicarboxylic acid, hexahydroterephthalic acid and hexahydroisophthalic acid.

Specific examples of the aromatic diamines include metaxylylenediamine, paraxylylenediamine and para-bis(2-aminoethyl)benzene.

Specific examples of the aromatic dicarboxylic acids include terephthalic acid, isophthalic acid, phthalic acid, 2,6-naphthalene dicarboxylic acid, diphenyl-4,4'-dicarboxylic acid, diphenoxyethane dicarboxylic acid and functional derivatives thereof.

Specific examples of the polyamide include polyamide 4, polyamide 6, polyamide 10, polyamide 11, polyamide 12, polyamide 4,6, polyamide 6,6, polyamide 6,10, polyamide 6T, polyamide 9T, polyamide 6IT, poly(metaxylylene adipamide) (polyamide MXD6), isophthalic acid copolymerized poly(metaxylylene adipamide) (polyamide MXD6I), poly(metaxylylene sebacamide) (polyamide MXD10), poly(metaxylylene dodecanamide) (polyamide MXD12), poly(1,3-bisaminocyclohexane adipamide) (polyamide BAC6) and poly(paraxylylene sebacamide) (polyamide PXD10). Of the above, polyamide 6, polyamide MXD6 and polyamide MXD6I are preferable.

As a component to be copolymerized with the polyamide, a polyether having at least one terminal amino group or terminal carboxyl group, and having a number average molecular weight from 2000 or higher to 20000 or lower, an organic carboxylic acid salt of the polyether having at least one terminal amino group or an amino salt of the polyether having at least one terminal carboxyl group, can be used. Specific examples thereof include bis(aminopropyl)poly(ethylene oxide) (polyethylene glycol having a number average molecular weight from 2000 or higher to 20000 or lower).

The partially aromatic polyamides may contain a constituent unit derived from a polyvalent carboxylic acid having 3 bases or more, such as trimellitic acid and pyromellitic acid, as long as they maintain a substantially linear chain.

[Ethylene-Vinyl Alcohol Copolymer]

As the ethylene vinyl alcohol copolymer to be used in layer B of the oxygen-absorbing multilayer body of the embodiment, an ethylene vinyl alcohol copolymer, which contains an ethylene in an amount from 15 mole % or more to 60 mole % or less and has a saponification degree of a vinyl acetate component of 90 mole % or more, is preferable. The content of ethylene is preferably from 20 mole % or more to 55 mole % or less and more preferably from 29 mole % or more to 44 mole % or less. The saponification degree of the vinyl acetate component is preferably 95 mole % or more. Note that the ethylene vinyl alcohol copolymer may further contain a small amount of comonomer of propylene, isobutene, an α-olefin such as α-octene, α-dodecene and α-octadecene, an unsaturated carboxylic acid or a salt thereof, a partial alkyl ester, a complete alkyl ester, a nitrile, an amide, an anhydride, and an unsaturated sulfonic acid or a salt thereof, etc.

[Vegetable-Derived Resin]

As the vegetable-derived resin to be used in layer B of the oxygen-absorbing multilayer body of the embodiment, any vegetable-derived resin can be used as long as it is a resin containing a vegetable-derived substance as a raw material. The vegetable serving as a raw material thereof is not particularly limited. Specific examples of the vegetable-derived resin include aliphatic polyester based biodegradable resins. Examples of the aliphatic polyester based biodegradable resins include poly(α-hydroxy acid) such as poly(glycolic acid) (PGA) and polylactic acid (PLA); and polyalkylene alkanoate such as polybutylenesuccinate (PBS) and polyethylenesuccinate (PES).

[Chlorine Resin]

The chlorine resin to be used in layer B of the oxygen-absorbing multilayer body of the embodiment is not limited as long as it is a resin containing chlorine in a constituent unit and a known resin can be used. Specific examples of the chlorine resin include poly(vinyl chloride), poly(vinylidene chloride) and copolymers of these with vinyl acetate, a maleic acid derivative, a higher alkyl vinyl ether, and the like.

The layer B of the oxygen-absorbing multilayer body of the present embodiment may contain additives known in the art as optional components other than the thermoplastic resin as mentioned above. Examples of such optional components include, but not particularly limited to, additives such as a drying agent, a pigment such as titanium oxide, a dye, an antioxidant, a slipping agent, an antistatic agent, a plasticizer, a stabilizer, a lubricant; fillers such as calcium carbonate, clay, mica and silica; and a deodorant. Particularly, in view of recycling and reprocessing offcuts generated during manufacturing, it is preferable to add an antioxidant to layer B.

[Other Layers]

The oxygen-absorbing multilayer injection-molded article of the embodiment may have an optional layer, which varies depending upon the desired performance etc., other than the oxygen-absorbing layer (layer A) and the resin layer (layer B) mentioned above. Examples of such an optional layer include, in view of more enhancing interlayer adhesion strength between adjacent two layers, an adhesion layer (layer AD) is preferably provided between the two layers. The adhesion layer preferably contains a thermoplastic resin having adhesiveness. Examples of the thermoplastic resin having adhesiveness include acid modified polyolefin resins obtained by modifying a polyolefin resin such as a polyethylene or a polypropylene with an unsaturated carboxylic acid such as acrylic acid, methacrylic acid, maleic acid, maleic anhydride, fumaric acid and itaconic acid; and polyester thermoplastic elastomers containing a polyester block copolymer as a main component. In view of enhancing adhesiveness with the aforementioned resin layer (layer B), a resin obtained by modifying the same type of resin as a thermoplastic resin used in layer B is preferable. Note that the thickness of the adhesion layer is not particularly limited; however, in view of ensuring molding processability while exerting substantial adhesion strength, the thickness of the adhesion layer is preferably from 2 μm or thicker to 100 μm or thinner, more preferably from 5 μm or thicker to 90 μm or thinner and further preferably from 10 μm or thicker to 80 μm or thinner.

As a method for manufacturing the oxygen-absorbing multilayer injection-molded article of the embodiment, a known method, which varies depending upon the properties of materials, a desired shape, etc., can be applied. Thus, the manufacturing method is not particularly limited. A multilayer injection-molded article can be manufactured by applying various injection molding methods. For example, an oxygen-absorbing resin composition as mentioned above is injected from an injection cylinder through a mold hot runner into a mold cavity by use of a molding machine provided with an injector and an injection mold. In this manner, an injection-molded article having a shape in accordance with the cavity shape of the injection mold can be manufactured. To impart heat resistance to the neck portion of the obtained molded article, a heat treatment may be applied to the neck portion in this stage to perform crystallization. In this case, the degree of crystallization, which may be appropriately specified depending upon the type of resin to be used and desired performance, is not particularly limited. Generally, the degree of crystallization is preferably about 30 to 50% and more preferably 35 to 45%. Note that the crystallization of the neck portion of a molded article may be performed after a secondary processing (described later) is applied.

For example, using a molding machine having 2 or more injectors and an injection mold, a material for constituting layer A and a material for constituting layer B are injected from respective injection cylinders through a mold hot runner into a cavity. In this manner, a multilayer injection-molded article of a two-layer (NB) structure having a shape in accordance with the cavity shape of the injection mold can be manufactured. Furthermore, first, a material for constituting layer B is injected from the injection cylinder, and then, a material for constituting layer A is injected from another injection cylinder simultaneously with a resin for constituting layer B, subsequently, the resin for constituting layer B is injected in a necessary amount to fill the cavity to manufacture a multilayer injection-molded article constituted of three layers (B/A/B). Furthermore, first, a material for constituting layer B is injected, then a material for constituting layer A is solely injected, and finally the material for constituting layer B is injected in a necessary amount to fill the cavity to manufacture a multilayer injection-molded article constituted of five layers (B/A/B/A/B). Moreover, first, a material for constituting layer B1 is injected from an injection cylinder and then a material for constituting layer B2 is injected from another injection cylinder simultaneously with a resin for constituting layer B1, subsequently a resin for constituting layer A is injected simultaneously with resins for constituting layer B1 and layer B2 and thereafter the resin for constituting layer B1 is injected in a necessary amount to fill the cavity to manufacture a multilayer injection-molded article constituted of five layers (B1/B2/A/B2/B1).

The shape of the oxygen-absorbing multilayer injection-molded article of the embodiment may be appropriately specified depending upon the use and is not particularly limited. When injection molding using a mold is performed as described above, any shape which corresponds to the shape of cavity of the mold can be obtained.

The thickness of the oxygen-absorbing multilayer injection-molded article of the embodiment is not particularly limited. In view of enhancing oxygen-absorbing performance; at the same time, ensuring physical properties such as flexibility, required for an injection-molded article, the thickness is preferably from 3 µm or thicker to 5000 µm or thinner, more preferably, from 5 µm or thicker to 4500 µm or thinner and further preferably from 10 µm or thicker to 4000 µm or thinner.

By using the oxygen-absorbing multilayer injection-molded article of the embodiment as a part of the structure of a sealing container, oxygen within the container can be absorbed (even if the amount of oxygen transmitting or coming into the container from the outside through the wall of the container is small, transmitting or incoming oxygen is also absorbed) to prevent deterioration etc. of the content (article to be packed) to be stored by oxygen. At this time, the injection-molded article of the embodiment itself may be molded in the shape of the container. In consideration that the oxygen-absorbing injection-molded article of the embodiment delivers oxygen-absorbing performance, the molded article is preferably a preservation container such as a cup container (injection cup) and a bottle container.

The injection-molded article of the embodiment can be molded into a container by applying a secondary processing (described later). For example, when a secondary processing is applied to form a PET bottle, the injection-molded article of the embodiment is preferably a test tube preform (parison). The oxygen-absorbing multilayer container obtained by a secondary processing of the oxygen-absorbing injection-molded article of the embodiment can also absorb oxygen within the container (even if the amount of oxygen transmitting or coming into the container from the outside through the wall of the container is small, transmitting or incoming oxygen is also absorbed) to prevent deterioration etc. of the content (article to be packed) stored therein by oxygen. Note that examples of the shape of a container after secondary processing include a bottle and a cup.

As a method for secondary processing the oxygen-absorbing multilayer injection-molded article of the present embodiment, for example, blow-molding and stretch blow-molding are mentioned with stretch blow molding being preferable, but not particularly limited to these and a known molding method can be applied.

For example, in the injection blow-molding, first, a preform (parison) in the form of a test tube is molded as the oxygen-absorbing multilayer injection-molded article of the embodiment. Then, the preform is heated and allowed to fit into a final-form mold with the mouth portion thereof immobilized by a jig. Thereafter, air is fed from the mouth portion to swollen the preform, with the result that the preform comes into contact with the mold. Then, the preform is cooled and solidified to mold a bottle.

For example, in the injection stretch blow-molding, first, a preform (parison) in the form of a test tube is molded as the oxygen-absorbing multilayer injection-molded article of the embodiment. Then, the preform is heated and allowed to fit into a final-form mold with the mouth portion thereof immobilized by a jig. Thereafter, air is fed from the mouth portion while stretching by a stretching rod to perform blow-drawing of the preform to allow the preform in contact with the mold. Then, the preform is cooled and solidified to mold a bottle.

The injection stretch blow-molding methods herein are in general roughly divided into a hot parison system and a cold parison system. In the former one, a preform is not completely cooled and a preform in a soft condition is blow-molded. In contrast, in the latter one, a preform with a bottom having a size considerably smaller than the size of a final shape and formed of an amorphous resin in a super cooling condition is formed, and the preform is pre-heated to a drawing temperature and molded in the axis direction by tensile stretching in a final-shape mold; at the same time, molded in the circumference direction by stretch blowing. Because of this, the latter one is suitable for large scale production. In either method, a preform is heated to a drawing temperature of a glass transition point (Tg) or more and thereafter stretched in the longitudinal direction by a stretching rod in a final-shape mold heated to a heat treatment (heat set) temperature; at the same time, stretched in the transverse direction by air blow. Herein, the draw ratio of final blow-molded article is not particularly limited; however, the draw ratio is preferably from 1.2 times or more to 6 times or less in the longitudinal direction and from 1.2 times or more to 4.5 times or less in the transverse direction.

Note that in the injection blow-molding, as a general technique, the final-shape mold is heated to a temperature at which crystallization of a resin is accelerated, for example, 120 to 230° C. and preferably 130 to 210° C. in the case of a PET resin. Thereafter, in the blowing step, a heat treatment is performed by bringing the outside wall of a molded article (container) into contact with the inner surface of the mold in a predetermined time. After the heat treatment is performed in a predetermined time, a fluid for blowing is changed to an internal cooling fluid to cool the inner layer. The heat treatment time at this time varies depending upon the thickness and temperature of a blow-molded article. The heat treatment time in the case of a PET resin, is generally 1.5 to 30 seconds and preferably 2 to 20 seconds. Whereas, the cooling time also varies depending upon the heat treatment temperature and the type of cooling fluid; however, the cooling time is generally 0.1 to 30 seconds and preferably 0.2 to 20 seconds. Owing to the heat treatment, each portions of the molded article is crystallized.

As the cooling fluid, air of normal temperature, cooled gases such as nitrogen, air, and carbon dioxide gas of −40° C. to +10° C. are used. Other than these, a chemically inactive liquefied gas such as liquefied nitrogen gas, liquefied carbonate gas, liquefied trichlorofluoromethane gas, liquefied dichlorodifluoromethane gas and other liquefied aliphatic hydrocarbon gases can be used. The cooling fluid may be used in combination with liquid mist requiring high heat of vaporization such as water. By using of such a cooling fluid, significant cooling temperature can be provided. In stretch blow-molding, two molds are used. In the first mold, a heat treatment may be performed within a predetermined temperature and time and then the blow-molded article may be transferred to the second mold for cooling. The blow-molded article may be blow-molded again, simultaneously with being cooled. The outer layer of the blow-molded article taken out from the mold is allowed to stand still to cool it or cold air can be applied to cool the outer layer of the blow-molded article.

As another blow-molding method, a two-step blow-molding is exemplified, in which the aforementioned preform is processed into a primary blow-molded article, which is larger in size than a final blow-molded article, by use of a primary stretch-blow mold, and subsequently, the primary blow-molded article is heated to shrink, and then, processed into a final blow-molded article by stretch blow-molding using a secondary mold. According to the blow-molding method, the bottom of the blow-molded article is sufficiently stretched to reduce in thickness, with the result that a blow molded article with the bottom, which is rarely deformed during hot charging and heat sterilization and having excellent impact resistance can be obtained.

Note that the oxygen-absorbing multilayer injection-molded article of the embodiment and the oxygen-absorbing multilayer container obtained by subjecting it to secondary processing may be coated with e.g., a vapor deposition film of an inorganic compound or an inorganic oxide or an amorphous carbon film.

Examples of the inorganic compound or inorganic oxide of the vapor deposition film include, but not particularly limited to, aluminum, alumina and silicon oxide. By virtue of the coating with a vapor deposition film of an inorganic compound or an inorganic oxide, it is possible to block elution of a low molecular weight organic compound from the injection-molded article of the embodiment and the container obtained by secondary processing of the article. Examples of the method for forming a vapor deposition film include a physical vapor deposition method such as a vacuum vapor deposition method, a sputtering method and an ion plating method and chemical vapor deposition methods such as PECVD. However, the method for forming a vapor deposition film is not particularly limited to these and known methods can be applied. Note that the thickness of the vapor deposition film is not particularly limited; however, in view of gas barrier property, light-blocking property, flex resistance, etc., the thickness is preferably from 5 nm or thicker to 500 nm or thinner and more preferable from 5 nm or thicker to 200 nm or thinner.

An amorphous carbon film, which is known as a diamond carbon film, is a hard carbon film also called as an i carbon film or a hydrogenated amorphous carbon film. Examples of a method for forming such an amorphous carbon film include, but not particularly limited to, a method in which the interior portion of a hollow molded article is exhausted to a vacuum, and then a carbon source gas is supplied and energy for generating a plasma is supplied to convert the carbon source gas into a plasma. In this manner, an amorphous carbon film is formed on the inner surface of the container. Owing to the coating with an amorphous carbon film, the transmission rate of a low molecular weight inorganic gas such as oxygen and carbon dioxide can be significantly reduced as well as adsorption of low molecular weight organic compounds having odor to an oxygen-absorbing injection-molded article can be suppressed. Note that the thickness of such an amorphous carbon film is not particularly limited; however, in view of effect of suppressing adsorption of a low molecular weight organic compound, effect of improving a gas barrier property, adhesion property to a plastic, durability, transparency, etc., the thickness is preferably from 50 nm or thicker to 5000 nm or thinner.

In using the oxygen-absorbing resin composition, etc. of the embodiment, initiation of an oxygen absorption reaction can be facilitated and an oxygen-absorbing rate can be increased by irradiation of an energy beam. Examples of the usable energy beam include visible ray, UV ray, X-ray, electron ray and γ ray. The amount of irradiation energy can be appropriately selected depending upon the type of energy beam to be used.

The oxygen-absorbing resin composition of the present embodiment does not require a moisture content for absorbing oxygen. In other words, oxygen-absorbing performance is delivered regardless of the presence or absence of the moisture content of an article to be packed. Thus, the composition can be used in a wide variety of uses no matter which type of article to be packed is contained. In particular, no odor is produced after absorption of oxygen, the composition can be particularly preferably used in e.g., foods, cooking foods, beverages, health foods and medicinal products. More specifically, since the oxygen-absorbing resin composition of the present embodiment and various types of moldings such as laminates using the composition are excellent in oxygen-absorbing performance in a wide range of humidity conditions from low humidity to high humidity (relative humidity 0% to 100%) and excellent in taste and flavor retention property of a content, they are suitable for packaging various articles. In addition, unlike a conventional oxygen-absorbing resin composition using iron powder, the oxygen-absorbing resin composition of the present embodiment can be suitably used for storing an article to be packed (for example, alcohol beverages and carbonate beverages) which cannot be stored because of the presence of iron.

Specific examples of the article to be packed include, but not particularly limited to, beverages such as cow milk, juice, coffee, tea and alcohol beverage; liquid seasonings such as source, soy sauce, noodle broth and dressing; cooking foods such as soup, stew and curry; paste foods such as jam and mayonnaise; seafood products such as tuna and fish and shellfish; processed milk products or processed egg products such as cheese, butter and egg; processed livestock products such as meat, salami sausage, sausage and ham; vegetables such as carrot, potato, asparagus and shiitake mushroom; fruits; egg; noodles; rices such as rice and polished rice; cereals such as beans; processed rice foods or processed cereal foods such as steamed rice, festive red rice, rice cake and rice gruel; confectionaries such as adzuki-bean jelly, pudding, cake and steamed bean-jam buns; dry foods (food having a low water activity) such as powdered seasoning, powdered coffee, coffee bean, tea, powdered milk for infants, cooking food for infants, powdered dietary food, nursing care cooking food, dry vegetable, Japanese cracker and rice cracker; chemical products such as an adhesive, a gluing agent, an agrichemical and a pesticide; medicinal products; health foods such as a vitamin supplement; pet foods; sundry articles such as a cosmetic, a shampoo, a conditioner and a detergent; and other various articles. Particularly, the oxygen-absorbing resin composition of the embodiment is suitable for packaging materials for an article to be packed easily degrading in the presence of oxygen. Examples of such an article to be packed include beverages such as beer, wine, fruit juice beverage, fruit juice, vegetable juice, carbonate soft drink and tea; foods such as fruit, nut, vegetable, meat products, infant food, coffee, jam, mayonnaise, ketchup, edible oil, dressing, source, food boiled in soy sauce and milk products; and others such as medicinal products and cosmetics. Note that the term "water activity" refers to a scale showing the content of free water in an article and represented by a numeral from 0 to 1. The article containing no water is represented by 0 and pure water is represented by 1. More specifically, the water activity Aw of an article is defined as follows:

$$Aw = P/P_0 = RH/100$$

where P represents a water vapor pressure of a space where an article is sealed and the state of the space reaches equivalent, $P_0$ represents the water vapor pressure of pure water and RH (%) represents the relative humidity of the space.

Note that before and after filling (packaging) of an article to be packed, the container and the article to be packed can be sterilized by a method suitable for the article to be packed. Examples of the sterilization method include heat sterilization such as a hot water treatment performed at 100° C. or lower, a hot water treatment under application of pressure performed at 100° C. or higher, and a ultrahigh temperature heat treatment performed at 130° C. or higher; sterilization with an electromagnetic wave such as UV rays, microwave and gamma ray; gas treatment performed with ethylene oxide etc.; and sterilization with a chemical agent such as hydrogen peroxide and hypochlorite.

EXAMPLES

The present invention will be more specifically described by use of Examples and Comparative Examples, below; however, the present invention is not limited by these. Unless otherwise specified, NMR measurement was performed at room temperature. In Examples and Comparative Examples, physical property values were measured by using the following measurement methods and measurement apparatuses.
(Method for Measuring Glass Transition Temperature)
Glass transition temperature was measured in accordance with JIS K7122. As a measurement apparatus, "DSC-60", manufactured by Shimadzu Corporation was used.

(Method for Measuring Melting Point)
As the melting point, a DSC melting point peak temperature was measured in accordance with ISO11357. As a measurement apparatus, "DSC-60", manufactured by Shimadzu Corporation was used.
(Method for Determining Weight Average Molecular Weight and Number Average Molecular Weight)
The weight average molecular weight and number average molecular weight were measured by GPC-LALLS. As a measurement apparatus, "HLC-8320GPC", manufactured by Tosoh Corporation was used.

Synthesis Example of Monomer

To an autoclave of 18 L (inner volume), dimethyl naphthalene-2,6-dicarboxylate (2.20 kg), 2-propanol (11.0 kg) and a catalyst (350 g containing 50 wt % of water) of 5% palladium immobilized on active carbon were supplied. Subsequently, the air within the autoclave was replaced with nitrogen and the nitrogen was further replaced with hydrogen. Thereafter, hydrogen was supplied until the interior pressure of the autoclave reached 0.8 MPa. Next, a stirrer was driven and a rotation speed was adjusted to be 500 rpm. After the interior temperature was increased up to 100° C. over 30 minutes, hydrogen was further supplied to set a pressure at 1 MPa. After that, hydrogen was continuously supplied in accordance with a reduction of pressure with the progression of a reaction so as to maintain 1 MPa. Seven hours later, since pressure reduction was stopped, the autoclave was cooled and unreacted residual hydrogen was released, and then the reaction solution was taken out from the autoclave. After the reaction solution was filtered and the catalyst was removed, 2-propanol was distilled away from the separated filtrate by an evaporator. To the crude product obtained, 2-propanol (4.40 kg) was added. Dimethyl tetralin-2,6-dicarboxylate was purified by recrystallization in a yield of 80%. NMR analysis results of the obtained dimethyl tetralin-2,6-dicarboxylate are as follows.
$^1$H-NMR (400 MHz CDCl$_3$) δ 7.76-7.96 (2H m), 7.15 (1H d), 3.89 (3H s), 3.70 (3H s), 2.70-3.09 (5H m), 1.80-1.95 (1H m)

Production Example of Polymer

Production Example 1

To a polyester resin manufacturing apparatus equipped with a packed tower system rectifier, a partial condenser, a total condenser, a cold trap, a stirrer, a heating unit and a nitrogen inlet tube, 543 g of the dimethyl tetralin-2,6-dicarboxylate obtained in the above Synthesis Example of a monomer, 217 g of ethyleneglycol, 0.038 g of tetrabutyl titanate and 0.106 g of zinc acetate were supplied. The temperature of the mixture was raised up to 230° C. under a nitrogen atmosphere and a transesterification reaction was performed. After the reaction conversion rate of the dicarboxylate component reached 90% or more, 0.019 g of tetrabutyl titanate was further added thereto. The temperature was gradually increased and pressure was gradually decreased and then polycondensation was performed at 250° C. and 133 Pa or less to obtain a polyester compound (1).
The weight average molecular weight and number average molecular weight of the obtained polyester compound (1) were determined by GPC (gel permeation chromatography). As a result, the polystyrene-equivalent weight average molecular weight was 5.9×10$^4$ and the number average molecular weight thereof was 2.9×10$^4$. The glass transition temperature and melting point of the polyester compound (1) were measured by DSC. As a result, the glass transition temperature was 69° C. and the melting point was not determined because of amorphous crystal.

Production Example 2

A polyester compound (2) was synthesized in the same manner as in Production Example 1 except that 1,4-butanediol was used in place of ethylene glycol of Production Example 1 and a weight thereof was 315 g. The polystyrene-equivalent weight average molecular weight of the polyester compound (2) was $8.5 \times 10^4$ and the number average molecular weight thereof was $3.6 \times 10^4$, the glass transition temperature was 36° C. and the melting point was 145° C.

Production Example 3

A polyester compound (3) was synthesized in the same manner as in Production Example 1 except that 1,6-hexanediol was used in place of ethylene glycol of Production Example 1 and a weight thereof was 413 g. The polystyrene-equivalent weight average molecular weight of the polyester compound (3) was $6.5 \times 10^4$ and the number average molecular weight thereof was $2.5 \times 10^4$, the glass transition temperature was 16° C. and the melting point was 137° C.

Production Example 4

A polyester compound (4) containing ethylene glycol and 1,4-butanediol in a molar ratio of 60:40 was synthesized in the same manner as in Production Example 1 except that the ethylene glycol of Production Example 1 was 150 g and further 93 g of 1,4-butanediol was supplied. The polystyrene-equivalent weight average molecular weight of the polyester compound (4) was $8.2 \times 10^4$, the number average molecular weight thereof was $3.3 \times 10^4$, the glass transition temperature was 56° C. and the melting point was not determined because of amorphous crystal.

Production Example 5

A polyester compound (5) was synthesized in the same manner as in Production Example 1 except that the zinc acetate of Production Example 1 was 0.212 g. The polystyrene-equivalent weight average molecular weight of the polyester compound (5) was $6.8 \times 10^4$, the number average molecular weight thereof was $2.8 \times 10^4$, the glass transition temperature was 69° C. and the melting point was not determined because of amorphous crystal.

Production Example 6

A transesterification reaction was performed in the same manner as in Production Example 1 except that the zinc acetate was not added. After the reaction conversion rate of the dicarboxylate component reached 90% or more, 0.106 g of zinc acetate was added. The temperature was gradually increased and pressure was gradually decreased and then polycondensation was performed at 250° C. and 133 Pa or less to obtain a polyester compound (6). The polystyrene-equivalent weight average molecular weight of the polyester compound (6) was $6.5 \times 10^4$, the number average molecular weight thereof was $2.7 \times 10^4$, the glass transition temperature was 69° C. and the melting point was not determined because of amorphous crystal.

Production Example 7

A polyester compound (7) was synthesized in the same manner as in Production Example 1 except that tetrabutyl titanate was not added during the process of transesterification reaction. The polystyrene-equivalent weight average molecular weight of the polyester compound (7) was $6.2 \times 10^4$, the number average molecular weight thereof was $2.5 \times 10^4$, the glass transition temperature was 69° C. and the melting point was not determined because of amorphous crystal.

Production Example 8

A polyester compound (8) was synthesized in the same manner as in Production Example 1 except that the zinc acetate was not added. The polystyrene-equivalent weight average molecular weight of the polyester compound (8) was $6.4 \times 10^4$, the number average molecular weight thereof was $3.0 \times 10^4$, the glass transition temperature was 69° C. and the melting point was not determined because of amorphous crystal.

Example 1

With a polyester compound (1) (100 parts by mass), cobalt stearate (II) (0.02 parts by mass in terms of cobalt) was dry-blended. The obtained oxygen-absorbing resin composition was formed into a film by use of a double-screw extruder having two screws of 20 mm in diameter at an extrusion temperature of 240° C., a screw rotation number of 60 rpm, a feed screw rotation number of 16 rpm and a haul-off speed of 1.3 m/min. In this manner, an oxygen-absorbing film having a width of 130 mm and a thickness of 95 to 105 μm was manufactured.

Next, two gas barrier bags formed of an aluminum foil laminate film were prepared. Two test pieces (100 mm in length×100 mm in width) of the obtained oxygen-absorbing film were put in the two gas barrier bags together with 500 cc of air. The relative humidity in one of the bags was adjusted to be 100%; whereas the relative humidity of the other bag was adjusted to be 30% and then the bags were separately sealed. The sealed bags thus obtained were stored at 40° C. for 7 days. The total amount of oxygen absorbed by the oxygen-absorbing film during this period was measured. The measurement of an amount of oxygen absorbed was performed using an oxygen content meter (trade name: LC-750F, manufactured by Toray Industries, Inc.).

Similarly, sealed bags were manufactured so as to have a relative humidity of 100% and stored at 40° C. and under a relative humidity of 100% for one month. The appearance of the oxygen-absorbing film after the storage of one month was visually checked and odor after the bag was opened was checked. These results are shown in Table 1.

Example 2

An oxygen-absorbing film was manufactured in the same manner as in Example 1 except that a polyester compound (2) was used in place of the polyester compound (1). The amount of oxygen absorbed was measured, appearance was visually observed and odor was checked. These results are shown in Table 1.

Example 3

An oxygen-absorbing film was manufactured in the same manner as in Example 1 except that a polyester compound (3) was used in place of the polyester compound (1). The amount of oxygen absorbed was measured, appearance was visually observed and odor was checked. These results are shown in Table 1.

Example 4

An oxygen-absorbing film was manufactured in the same manner as in Example 1 except that a polyester compound (4) was used in place of the polyester compound (1). The amount of oxygen absorbed was measured, appearance was visually observed and odor was checked. These results are shown in Table 1.

Example 5

An oxygen-absorbing film was manufactured in the same manner as in Example 1 except that a polyester compound (5) was used in place of the polyester compound (1). The amount of oxygen absorbed was measured, appearance was visually observed and odor was checked. These results are shown in Table 1.

Example 6

An oxygen-absorbing film was manufactured in the same manner as in Example 1 except that a polyester compound (6) was used in place of the polyester compound (1). The amount of oxygen absorbed was measured, appearance was visually observed and odor was checked. These results are shown in Table 1.

Example 7

An oxygen-absorbing film was manufactured in the same manner as in Example 1 except that a polyester compound (7) was used in place of the polyester compound (1). The amount of oxygen absorbed was measured, appearance was visually observed and odor was checked. These results are shown in Table 1.

Comparative Example 1

An oxygen-absorbing film was manufactured in the same manner as in Example 1 except that a polyester compound (8) was used in place of the polyester compound (1). The amount of oxygen absorbed was measured, appearance was visually observed and odor was checked. These results are shown in Table 1.

Comparative Example 2

An oxygen-absorbing film was manufactured in the same manner as in Example 1 except that the polyester compound (8) was used in place of the polyester compound (1) and that zinc acetate was added to the oxygen-absorbing resin composition in an amount of 0.007 parts by mass in terms of zinc based on 100 parts by mass of the polyester compound (8). The amount of oxygen absorbed was measured, appearance was visually observed and odor was checked. These results are shown in Table 1.

Comparative Example 3

An oxygen-absorbing film was manufactured in the same manner as in Example 1 except that N-MXD6 (trade name: MX nylon S6011, manufactured by Mitsubishi Gas Chemical Company Inc.) was used in place of the polyester compound (1). The amount of oxygen absorbed was measured, appearance was visually observed, and odor was checked. These results are shown in Table 1.

TABLE 1

| | Resin used in oxygen-absorbing resin composition | Amount of zinc contained in oxygen-absorbing resin composition[1] | Amount of oxygen absorbed/3rd day[4] | |
|---|---|---|---|---|
| | | | Humidity 100% | Humidity 30% |
| Example 1 | Polyester compound (1) | 0.007 | 7 cc | 8 cc |
| Example 2 | Polyester compound (2) | 0.007 | 8 cc | 9 cc |
| Example 3 | Polyester compound (3) | 0.007 | 10 cc | 10 cc |
| Example 4 | Polyester compound (4) | 0.007 | 8 cc | 7 cc |
| Example 5 | Polyester compound (5) | 0.014 | 8 cc | 8 cc |
| Example 6 | Polyester compound (6) | 0.014[2] | 9 cc | 8 cc |
| Example 7 | Polyester compound (7) | 0.007 | 8 cc | 7 cc |
| Comparative Example 1 | Polyester compound (8) | 0 | 1 cc | 2 cc |
| Comparative Example 2 | Polyester compound (8) | 0.007[3] | 1 cc | 2 cc |
| Comparative Example 3 | N-MXD6 | 0 | 3 cc | 1 cc |

| | Amount of oxygen absorbed/7th day[5] | | | |
|---|---|---|---|---|
| | Humidity 100% | Humidity 30% | Appearance[6] | Odor[6] |
| Example 1 | 12 cc | 14 cc | Shape was maintained | None |
| Example 2 | 14 cc | 18 cc | Shape was maintained | None |
| Example 3 | 20 cc | 22 cc | Shape was maintained | None |
| Example 4 | 14 cc | 15 cc | Shape was maintained | None |
| Example 5 | 13 cc | 13 cc | Shape was maintained | None |
| Example 6 | 14 cc | 15 cc | Shape was maintained | None |
| Example 7 | 12 cc | 12 cc | Shape was maintained | None |
| Comparative Example 1 | 7 cc | 8 cc | Shape was maintained | None |
| Comparative Example 2 | 8 cc | 8 cc | Shape was maintained | None |
| Comparative Example 3 | 6 cc | 1 cc | Collapsed | None |

[1] Zinc content (part by mass) based on 100 parts by mass of an oxygen-absorbing resin composition
[2] A zinc compound was added after completion of transesterification reaction at the time of synthesizing a polyester compound.
[3] A zinc compound was not added at the time of synthesizing a polyester compound, but added at the time of manufacturing an oxygen-absorbing film.
[4] Total amount of oxygen absorbed during 3 days from initiation of test
[5] Total amount of oxygen absorbed during 7 days from initiation of test
[6] Evaluated after one-month storage at 40° C. and a humidity of 100%.

As is apparent from the results shown in Table 1, the oxygen-absorbing resin compositions of the present embodiment delivered satisfactory oxygen-absorbing performance both in high humidity and low humidity conditions and the shapes of films were maintained even after absorption of oxygen without collapse and no odor was sensed.

Example 8

With the polyester compound (1) (100 parts by mass), cobalt stearate (II) (0.02 parts by mass in terms of cobalt) was dry-blended. The obtained mixture was supplied to a double-screw extruder having two screws of 37 mm in diameter, at a rate of 15 kg/h. Melt-kneading was performed at a cylinder temperature of 240° C. and a strand was extruded from an extruder head. After cooling, the strand was pelletized to obtain an oxygen-absorbing resin composition.

Subsequently, according to the following conditions, the thermoplastic resin for constituting layer B was injected from an injection cylinder and then the resin composition for constituting layer A was injected from another injection cylinder simultaneously with the thermoplastic resin for constituting layer B. Subsequently, the thermoplastic resin for constituting layer B was injected in a necessary amount to fill a cavity to form an injection-molded article (test tube-form parison) of three layers, i.e., constituted of layer B/layer A/layer B. The total mass of the parison was specified as 25 g and the mass of layer A was specified as 10% by mass based on the total mass of the parison. Note that polyethylene terephthalate (trade name: BK-2180, manufactured by Japan Unipet) was used as the thermoplastic resin for constituting layer B, and the above oxygen-absorbing resin composition was used as the resin composition for constituting layer A.
(Shape of Parison)

The whole length of a parison was specified as 95 mm, the outer diameter as 22 mm and the film thickness as 2.7 mm. Note that a parison was manufactured by use of an injection molding machine (Type: M200, proving 4 parisons, manufactured by Meiki Co., Ltd.).
(Molding Conditions for Parison)

| Temperature of injection cylinder for layer A | 250° C. |
| Temperature of injection cylinder for layer B | 280° C. |
| Temperature of resin flow channel in mold | 280° C. |
| Temperature of cooling water for mold | 15° C. |

The obtained parison was cooled and then subjected to a secondary processing, in which the parison was heated and shaped by biaxial stretching blow molding to manufacture a multilayer bottle (oxygen-absorbing multilayer container).
(Shape of Bottle Obtained by Secondary Processing)

The whole length of a multilayer bottle was specified as 223 mm, an outer diameter as 65 mm, an inner volume as 500 mL and a film thickness as 0.30 mm. The draw ratio of a double-screw stretch blow molding was specified as 2.6 folds lengthwise and 2.9 folds widthwise. The shape of the bottom was a petaloid-bottle type. The base of bottle had no dimple. Note that a blow molding machine (type: EFB 1000ET, manufactured by FRONTIER Inc.) was used for secondary processing, which was performed under the following conditions.
(Secondary Processing Conditions)
Heating temperature of parison: 100° C.
Pressure of a stretching rod: 0.5 MPa
Primary blow pressure: 0.7 MPa
Secondary blow pressure: 2.5 MPa
Primary blow delayed time: 0.33 sec
Primary blow time: 0.35 sec
Secondary blow time: 2.0 sec
Blow discharge time: 0.6 sec
Mold temperature: 30° C.

Subsequently, the oxygen transmission rate of the obtained container was measured at 23° C. and under an atmosphere having a relative humidity of 50% (outside the container) and a relative humidity of 100% (inside the container). In the measurement of the oxygen transmission rate, an oxygen transmission rate measurement apparatus (trade name: OX-TRAN 2-61, manufactured by MOCON) was used. The lower the measurement value, the more satisfactory oxygen barrier property. The oxygen transmission rate after 30 days from initiation of measurement is shown in Table 2.

Example 9

An oxygen-absorbing resin composition, a parison and a multilayer bottle were manufactured in the same manner as in Example 8 except that a polyester compound (2) was used in place of the polyester compound (1). The oxygen transmission rate of the multilayer bottle was measured. The evaluation results are shown in Table 2.

Example 10

An oxygen-absorbing resin composition, a parison and a multilayer bottle were manufactured in the same manner as in Example 8 except that a polyester compound (3) was used in place of the polyester compound (1). The oxygen transmission rate of the multilayer bottle was measured. The evaluation results are shown in Table 2.

Example 11

An oxygen-absorbing resin composition, a parison and a multilayer bottle were manufactured in the same manner as in Example 8 except that a polyester compound (4) was used in place of the polyester compound (1). The oxygen transmission rate of the multilayer bottle was measured. The evaluation results are shown in Table 2.

Example 12

An oxygen-absorbing resin composition, a parison and a multilayer bottle were manufactured in the same manner as in Example 8 except that a polyester compound (5) was used in place of the polyester compound (1). The oxygen transmission rate of the multilayer bottle was measured. The evaluation results are shown in Table 2.

Example 13

An oxygen-absorbing resin composition, a parison and a multilayer bottle were manufactured in the same manner as in Example 8 except that a polyester compound (6) was used in place of the polyester compound (1). The oxygen transmission rate of the multilayer bottle was measured. The evaluation results are shown in Table 2.

Example 14

An oxygen-absorbing resin composition, a parison and a multilayer bottle were manufactured in the same manner as in Example 8 except that a polyester compound (7) was used in place of the polyester compound (1). The oxygen transmission rate of the multilayer bottle was measured. The evaluation results are shown in Table 2.

Comparative Example 4

An oxygen-absorbing resin composition, a parison and a multilayer bottle were manufactured in the same manner as in Example 8 except that a polyester compound (8) was used in place of the polyester compound (1). The oxygen transmission rate of the multilayer bottle was measured. The evaluation results are shown in Table 2.

Comparative Example 5

An oxygen-absorbing resin composition, a parison and a multilayer bottle were manufactured in the same manner as in Example 8 except that a polyester compound (8) was used in place of the polyester compound (1) and zinc acetate was added to the oxygen-absorbing resin composition in an amount of 0.007 parts by mass in terms of zinc based on 100 parts by mass of the polyester compound (8). The oxygen transmission rate of the multilayer bottle was measured. The evaluation results are shown in Table 2.

Comparative Example 6

A single-layer bottle having the same shape as in Example 8 was manufactured and the oxygen transmission rate of the single-layer bottle was measured in the same manner as in Example 8 except that instead of the polyester compound (1) and cobalt stearate (II), polyethylene terephthalate (trade name: BK-2180, manufactured by Japan Unipet) (100 parts by mass) was used. The evaluation results are shown in Table 2.

TABLE 2

| | Resin used in Layer A | Amount of zinc contained in Layer A[1] | Oxygen transmission rate/7th day mL/(0.21 atm · day · package) | Oxygen transmission rate/30th day mL/(0.21 atm · day · package) |
|---|---|---|---|---|
| Example 8 | Polyester compound (1) | 0.007 | 0.0002 | 0.0004 |
| Example 9 | Polyester compound (2) | 0.007 | 0.0004 | 0.0004 |
| Example 10 | Polyester compound (3) | 0.007 | 0.0005 | 0.0004 |
| Example 11 | Polyester compound (4) | 0.007 | 0.0005 | 0.0008 |
| Example 12 | Polyester compound (5) | 0.014 | 0.0003 | 0.0003 |
| Example 13 | Polyester compound (6) | 0.007 | 0.0004 | 0.0003 |
| Example 14 | Polyester compound (7) | 0.007[2] | 0.0002 | 0.0001 |
| Comparative Example 4 | Polyester compound (8) | 0 | 0.020 | 0.006 |
| Comparative Example 5 | Polyester compound (8) | 0.007[3] | 0.022 | 0.006 |
| Comparative Example 6 | Polyethylene terephthalate | 0 | 0.040 | 0.039 |

[1] Zinc content (part by mass) based on 100 parts by mass of a resin used in Layer A
[2] A zinc compound was added after completion of transesterification reaction at the time of synthesizing a polyester compound.
[3] A zinc compound was not added at the time of synthesizing a polyester compound, but added at the time of manufacturing an oxygen-absorbing film.

As is apparent from the results shown in Table 2, it was confirmed that the multilayer bottles of Examples 8 to 14, since oxygen is absorbed by the oxygen-absorbing layer, have low oxygen transmission rates and thus these bottles are excellent in oxygen barrier property.

The invention claimed is:

1. An oxygen-absorbing resin composition comprising a polyester compound and a transition metal catalyst,
   wherein the polyester compound has at least one constituent unit having a tetralin ring selected from the group consisting of constituent units represented by the following general formulas (5) to (7):

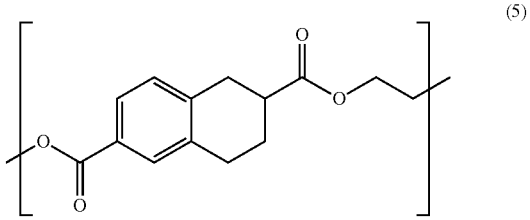

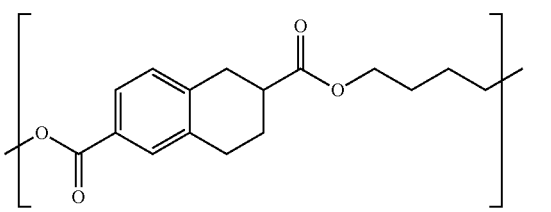

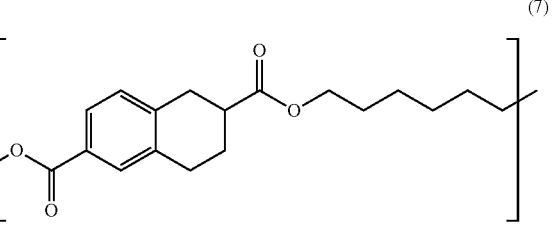

wherein the polyester compound is a polyester compound having a tetralin ring obtained by synthesis using a zinc compound contained in a catalyst;
   wherein the zinc compound contained in a catalyst is present together with the obtained polyester compound in the oxygen-absorbing resin composition;
   wherein the transition metal catalyst is different from the zinc compound contained in a catalyst;
   wherein the oxygen-absorbing resin composition is obtained by mixing the transition metal catalyst with the polyester compound present together with the zinc compound contained in a catalyst;
   wherein the transition metal catalyst is contained in an amount from 0.001 parts by mass or more to 10 parts by mass or less in terms of a transition metal based on 100 parts by mass of the polyester compound;
   wherein the zinc compound is contained in the oxygen-absorbing resin composition in an amount from 0.001 parts by mass or more to 10 parts by mass or less in terms of a zinc metal based on 100 parts by mass of the polyester compound; and
   wherein the content of the tetralin ring-containing polyester compound is at least 90% by mass based on a total amount of the oxygen-absorbing resin composition.

2. The oxygen-absorbing resin composition according to claim 1,
   wherein the transition metal catalyst comprises at least one transition metal selected from the group consisting of manganese, iron, cobalt, nickel and copper.

3. An oxygen-absorbing multilayer injection-molded article comprising an oxygen-absorbing layer formed of the oxygen-absorbing resin composition according to claim 1 and a resin layer comprising a thermoplastic resin.

4. An oxygen-absorbing multilayer container obtained by molding the oxygen-absorbing multilayer injection-molded article according to claim 3 into a cup or bottle form.

5. The oxygen-absorbing multilayer container according to claim 4,
   wherein the molding is stretch blow molding.

6. An oxygen-absorbing multilayer injection-molded article comprising an oxygen-absorbing layer formed of the oxygen-absorbing resin composition according to claim 2 and a resin layer comprising a thermoplastic resin.

7. The oxygen-absorbing resin composition according to claim 1, wherein the transition metal catalyst comprises cobalt.

8. The oxygen-absorbing resin composition according to claim 1, wherein the catalyst for producing a polyester compound further comprises titanium.

* * * * *